(12) United States Patent
Knowles

(10) Patent No.: US 11,720,510 B2
(45) Date of Patent: Aug. 8, 2023

(54) NETWORKED COMPUTER WITH MULTIPLE EMBEDDED RINGS

(71) Applicant: Graphcore Limited, Bristol (GB)

(72) Inventor: Simon Knowles, Bristol (GB)

(73) Assignee: GRAPHCORE LIMITED, Bristol (GB)

( * ) Notice: Subject to any disclaimer, the term of this patent is extended or adjusted under 35 U.S.C. 154(b) by 540 days.

(21) Appl. No.: 16/831,580

(22) Filed: Mar. 26, 2020

(65) Prior Publication Data

US 2020/0311528 A1 Oct. 1, 2020

(30) Foreign Application Priority Data

Mar. 27, 2019 (GB) ..................................... 1904267

(51) Int. Cl.

| | | |
|---|---|---|
| G06F 13/40 | (2006.01) | |
| G06F 15/80 | (2006.01) | |
| G06N 3/04 | (2023.01) | |
| G06N 3/08 | (2023.01) | |
| G06F 15/173 | (2006.01) | |
| G06N 3/063 | (2023.01) | |

(52) U.S. Cl.
CPC .... *G06F 13/4027* (2013.01); *G06F 15/17325* (2013.01); *G06F 15/8015* (2013.01); *G06N 3/04* (2013.01); *G06N 3/063* (2013.01); *G06N 3/08* (2013.01)

(58) Field of Classification Search
CPC ........... G06F 13/4027; G06F 15/17325; G06F 15/8015; G06F 15/17381; G06F 15/17387; G06F 15/17318; G06F 15/17356; G06N 3/04; G06N 3/063; G06N 3/08
See application file for complete search history.

(56) References Cited

U.S. PATENT DOCUMENTS

| 5,420,754 A | 5/1995 | Segelken et al. |
|---|---|---|
| 2010/0158005 A1* | 6/2010 | Mukhopadhyay .... H04L 49/109 370/392 |
| 2010/0235847 A1 | 9/2010 | Brehmer et al. |

(Continued)

OTHER PUBLICATIONS

Search Report and Written Opinion dated Jun. 23, 2020 for Patent Application No. PCT/EP2020/058621, 17 pages.

(Continued)

*Primary Examiner* — Dhaval V Patel
(74) *Attorney, Agent, or Firm* — Haynes and Boone LLP

(57) ABSTRACT

A computer comprising a plurality of interconnected processing nodes arranged in multiple stacked layers forming a multi-face prism is provided. Each face of the prism comprises multiple stacked pairs of nodes. Said nodes are connected by at least two intralayer links. Each node is connected to a corresponding node in an adjacent pair by an interlayer link. The corresponding nodes are connected by respective interlayer links to form respective edges. Each pair forms part of a layers, each layer comprising multiple nodes, each node connected to their neighbouring nodes in the layer by at least one of the intralayer links to form a ring. Data is transmitted around paths formed by respective sets of nodes and links, each path having a first portion between a first and second endmost layers, and a second portion provided between the second and first endmost layers and comprising one of the edges.

21 Claims, 17 Drawing Sheets

(56) References Cited

U.S. PATENT DOCUMENTS

| | | |
|---|---|---|
| 2014/0317379 A1 | 10/2014 | Miyazaki |
| 2018/0240039 A1* | 8/2018 | Mclaren ................. G06N 20/00 |
| 2019/0045003 A1* | 2/2019 | Archer .................. G06F 9/5066 |
| 2019/0121387 A1 | 4/2019 | Knowles |
| 2019/0121388 A1 | 4/2019 | Knowles |
| 2019/0121777 A1 | 4/2019 | Knowles |

OTHER PUBLICATIONS

Chen Juan et al: "Reducing Static Energy in Supercomputer Interconnection Networks Using Topology-Aware Partitioning", IEEE Transactions on Computers, IEEE, USA, vol. 65, No. 8, Aug. 1, 2016, pp. 2588-2602.

Office Action dated Nov. 17, 2022 for Japanese Patent Application No. 2021-557202. 4 pages.

\* cited by examiner

NETWORKED COMPUTER WITH MULTIPLE EMBEDDED RINGS

CROSS-REFERENCE TO RELATED APPLICATION

The present application claims priority to United Kingdom Patent Application No. 1904267.0, filed on Mar. 27, 2019, which is hereby incorporated by reference in its entirety.

FIELD

The present disclosure relates to the exchange of data between processing nodes connected in a computer particularly but not exclusively for optimising data exchange in machine learning/artificial intelligence applications.

BACKGROUND

Collectives are routines which are commonly used when processing data in a computer. They are routines which enable data to be shared and processed across multiple different processes, which may be running on the same processing node or different processing nodes. For example, if one process reads data from a data store it can use a "broadcast" process to share that data with other processes. Another example is when the result of a particular function is needed on multiple processes. A "reduction" is a result which has required the application of a compute function to a data value from each of multiple processes. "Gather" and "Scatter" collectives handle more than one data item. Certain collectives have become increasingly important in processing machine learning applications.

MPI (Message Passing Interface) is a message passing standard which can be applied to many parallel computing architectures. MPI defines a number of collectives applicable to machine learning. Two such collective are termed "Reduce" and "Allreduce". A Reduce operation enables a result of a compute function acting on multiple data values from different source processes to be provided at a single receiving process. Note that a receiving process may be one of the source processes, and that there may be multiple receiving processes. The Allreduce collective reduces the data values from multiple source processes and distributes the results to all the source processes, (which are acting as receiving processes for the reduced result). According to the MPI Standard, the Allreduce collective may be implemented by reducing the data values from all source processes in a reduce collective (e.g. at one of the processes) and then broadcasting the result to each source process.

FIG. 1 is a schematic block diagram of a distributed architecture for training a neural network. A source of training data 100 is provided. This may be a database or any other kind of data store capable of holding training data applicable to the neural network model being trained. Processing according to the neural network model is itself distributed across multiple processing units 110a, 110b, 110c etc. Only three units are shown in FIG. 1, but it will readily be appreciated that any number of processing units could be utilised. Each processing unit 110a, b, c receives batches of training data from the training data source 100. Each processing unit 110a, b, c holds a set of parameters 112a, 112b, 112c which define the model. An incoming batch of training data is processed with a current set of parameters in a calculation function 114 and the results of the calculation function are used to generate so-called deltas which represent the difference between the original parameter and the new parameter as a result of applying the calculating function on the batch of training data and the current set of parameters. In many neural networks, these parameters are termed "weights" and so the delta values are termed "delta weights". The weights are labelled 112a, b, c and the delta weights are labelled 116a, b, c in FIG. 1. It will be appreciated that in practice the weights and delta weights are stored in suitable stores accessible by the processing unit. If the weights and delta weights can be held in local memory, this renders the training process much more efficient.

The aim with the architecture of FIG. 1 is not to train three separate models but to train a single model in a distributed manner Therefore, the purpose is to have the model parameters (or weights) converged to a single common set in each processing unit. It is evident that starting from any particular set of weights, and assuming that the batch of training data received at each processing unit is not identical, then there will be a variation in the delta weights which are produced by each calculation function in each processing unit. What is needed therefore is a way to combine and distribute the delta weights across the processing units after each iteration of batched training data. This is shown diagrammatically in FIG. 1 where a combinational function 118 receives the delta weights from each processing unit and performs a mathematical function which reduces the delta weights, such as an averaging function. The output of the combinatorial function 118 is then fed back to combining circuitry 120a, 120b and 120c within each processing unit respectively. A new set of weights is thus produced as a combination of the original weights and the combined output from the combinatorial function 118, and the new weights 118a, 118b, 118c are stored back into local memory. Then, the next batch of training data is supplied to each processing unit and the process repeats multiple times. It is evident that if the starting weights of the processing units are the same, then after each iteration they will be reset again to the same, new values. It can readily be seen that the above is an example of where the Allreduce function is particularly useful. The delta weights are supplied to the combinatorial function 118a where they are reduced, and they are then supplied back to each of the processing units in their reduced form, where they can be combined with the original weights.

FIG. 1A is a schematic diagram to illustrate how an Allreduce collective might be implemented in a line connected topology of six processing nodes $N_0 \ldots N_5$. These processing nodes may correspond to the processing units of FIG. 1 in which the combinational function is distributed between the nodes so that there is no longer a combining node as in FIG. 1. The processing nodes are shown connected in a line configuration where each processing node is connected to its neighbour by a "forwards" links LF and a "backwards" link LB. As shown in the diagram, and as the directional phrases imply, the forward links connect processing nodes from the left to right in FIG. 1A, and the backwards links connect processing nodes from the right to left in FIG. 1A. Each processing node has a processing capability designated 200, and a storage capability designated 202. The processing capability and storage capability can be implemented in any of a very large number of ways. In one particular manifestation, the processing node may comprise multiple tiles, each individual tile having its own processing capability and associated memory capability. Each processing node also has one or more link interface which enables it to be connected to its neighbouring node via the links $L_F/L_B$.

To understand the implementation of the Allreduce collective, assume that the first node N0 has generated a "partial" vector labelled Δ0. The "partial" may be a data structure comprising an array, such as a vector or tensor, of delta weights. A partial vector is an array of partials each corresponding to a computation on the processing nodes. Each "partial" may be a set of delta weights. This is stored in the storage capability 202 ready to be exchanged in an Allreduce collective. In a simple "streaming" line Allreduce algorithm, the forward links are used for "reduce" and the backward links are used for "broadcast". The algorithm starts with the processing node at one end (the left hand node in FIG. 1A) sending its partial Δ0 to its adjacent node $N_1$. At this node, the incoming partial (Δ0 in this case) is reduced with the corresponding partial which was generated by the computing capability 200 at the processing node $N_1$, Δ1. The result of this reduction (shown as an ADD function in FIG. 1A) is then sent from processing node $N_1$ to the next connected node $N_2$. As mentioned further herein, the ADD function could be replaced by any combinatorial function which could be used to reduce the partials. The process occurs at each processing node, until at the final processing node, denoted $N_5$ in FIG. 1A, the reduction of the partials is complete. At this point, the reduction (summation Δ) is sent back to each processing node via the backward links $L_B$. It is received at each node, stored at that node in the memory capability and then also transmitted to the next node. In this way, each processing node ends up with the reduced result.

FIG. 1B shows a timing diagram of the reduce and broadcast phases. Note that a processing node cannot send a reduced result to the next node until it has received the incoming data from the previous node. Thus, there is an inherent latency marked Δ for each outgoing transmission on the forward links.

Furthermore, the backward links are not utilised for broadcast until the fully reduced result has been obtained at the end node. However, if the partial vectors are large due to the pipelined effect, the lead data item of the result, being the reduction of the first partials from the partial vectors at each node, will return to the starting node well before that node has finished sending the data items of its partial, so there may be a substantial overlap of activity on all forward and backward links.

In a modification to this algorithm, which represents a small improvement, processing nodes at each end of the line can start to transmit their partials towards a central node, with the reduction being completed at the central nodes. In that case, the result is broadcast back to the end nodes. Note that in this scenario, there would be a reversal in the direction of movement, for example between nodes $N_2$ and $N_3$, and $N_3$ and $N_4$ on both the forward and backward links. If a line is closed into a ring (by connecting the final node $N_5$ to the first node $N_0$ on both the backward and forward links), a pipeline algorithm can serialise reduction and broadcast in the same direction, so that the two logical rings formed by the bi-directional links can each operate independently on half of the data. That is, each partial vector is split into two and a first half ΔA is reduced on the forward links (as in FIG. 1A), and broadcast on the connecting leg between $N_5$ and $N_0$. The other half of the vector ΔB is reduced on the backward links, and then broadcast on the connecting ring of the backward links such that each node receives a copy of the Allreduce result.

FIG. 1D illustrates the corresponding timing diagram for the forward and backward links. A. The principles of the one-dimensional ring shown in FIGS. 1A and 1C can be extended to rings in two dimensions such as in a torus or toroid connected computer.

Using rings in two dimensions, an alternative approach is to implement Allreduce using a reduce scatter collective followed by an Allgather collective. A paper authored by Jain and Sabharwal entitled "Optimal Bucket Algorithms for large MPI collectives on torus interconnects" (ICS' 10, June 2-4, Tsukuba) presents bucket based algorithms for Allgather, reduce-scatter and Allreduce collectives assuming bi-directional links between processing nodes in a torus interconnected processor. This approach operates on the basis that there are multiple data values (fragments) to be handled in each step. In the reduce-scatter collective, each process starts with an initial partial vector. It is assumed that a reference here to a process is to a process carried out on a processing node. A partial vector can be divided into multiple elements or fragments. The corresponding elements of all processes are reduced and these reduced elements are then distributed across the processes. In the Allgather collective, every process receives all elements from all other processes. The reduce-scatter collective reduces all partials and stores each reduction on a respective node—see FIG. 2. The Allreduce collective operation can be implemented by performing a reduce-scatter collective followed by an Allgather collective operation.

As discussed in Jain's paper, torus interconnects are attractive interconnection architectures for distributed memory supercomputers. In the above discussion, collectives have been explained in the context of communication between processes. In a distributed super computer, processing nodes are interconnected, and each processing node may be responsible for one or more process in the context of collectives. A torus interconnect is a type of mesh interconnect with processing nodes arranged in an array of N dimensions, with each node connected to its nearest neighbours, and corresponding nodes on opposite edges of the array also connected. Bi-directional communication links exist between interconnected processing nodes.

The algorithms for implementing collectives which are discussed in the above-referenced paper authored by Jain and Sabharwal are applied on torus connected architectures. This allows the collectives to process different fragments of the vectors in rings in different dimensions at the same time, making the process bandwidth efficient. Indeed, Jain and Sabthawal present their techniques as optimal for an asymmetric torus, and it has been accepted in the field that this is the case.

An objective of the present disclosure is to present an improved topology and method for implementing an Allreduce function, particularly but not exclusively for use in processing functions in machine learning.

While the topologies and configurations described herein are particularly effective for the efficient implementation of Allreduce, they may also be advantageously used for other machine learning collectives and other types of parallel programs.

SUMMARY

According to an aspect of the invention there is provided a computer comprising a plurality of interconnected processing nodes arranging in a configuration with multiple stacked layers, each layer comprising three processing nodes connected by respective links between the processing nodes, wherein:

in end layers of the stack the three processing nodes are interconnected by two links adapted to operate simultaneously;

in central layers of the stack the three processing nodes are interconnected by single link; and processing nodes in each layer are connected to respective corresponding nodes in each adjacent layer by two links adapted to operate simultaneously.

A processing node in the configuration may be programmed to transmit data along three embedded one-dimensional logical rings, each logical ring using a set of processing nodes of this configuration in such a manner that three embedded one-dimensional logical rings operate simultaneously.

The configuration can be utilised to implement the All-reduce collective in a manner as herein described.

According to another aspect of the invention there is provided a computer comprising a plurality of interconnected processing nodes arranged in a configuration with multiple stacked layers, each layer comprising four processing nodes connected by respective links between the processing notes, wherein:

in end layers of the stack, the four processing nodes are interconnected in a ring formation by two links between the nodes, the two links adapted to operate simultaneously;

processing nodes in the multiple stacked layers provide four faces, each face comprising multiple layers, each layer comprising a pair of processing nodes;

wherein the processing nodes are programmed to operate a configuration to transmit data along embedded one-dimensional rings, each ring formed by processing nodes in two opposing faces.

Broadly, aspects of the inventions provide configurations of interconnected processing nodes in which faces of a configuration are formed by stacked layers of pairs of nodes and enable one-dimensional rings to be embedded in the faces. In the ladder configuration there is a single face, in the triangular configurations there are three faces, and in the box tube structure there are four faces.

Each processing node may comprise memory configured to store an array of data items ready to be exchanged in the reduce scatter phase, wherein each data item is respectively positioned in the array with corresponding data items being respectively positioned at corresponding locations in the arrays of other processing nodes. The array may be a "partial" (a vector of partial results) or a "result" (a vector of fully reduced partials).

The processing nodes may each be programmed to transmit data items in a forwards direction to its adjacent processing node in each ring the reduce-scatter phase. The data items which may be transmitted in each step are termed a "fragment". A fragment is piece of the vector—as described herein, vectors are divided into fragments to make use of logical rings formed in the embedded rings.

Each array may represent at least part of a vector of partial deltas, each partial delta representing an adjustment to a value stored at each processing node. Each processing node may be programmed to generate the vector of partial deltas in a compute step. Each processing node may be programmed to divide its vector into two sub arrays for respective utilisation of the two embedded rings.

Another aspect of the invention provides a computer comprising a plurality of interconnected processing nodes arranged in a configuration of multiple stacked layers of processing nodes forming a multi-face prism;

wherein each face of the prism comprises multiple stacked pairs of processing nodes, wherein the processing nodes of each pair are connected by at least two intralayer links, and the processing node of each pair is connected to a corresponding processing node in an adjacent pair by at least one interlayer link wherein the corresponding processing nodes are connected by respective interlayer links to form respective edges of the configuration; and wherein each pair of processing nodes forms part of one of the layers of the configuration, each layer comprising multiple processing nodes, each processing node connected to their neighbouring processing nodes in the layer by at least one of the intralayer links to form a ring;

wherein the multiple stacked layers comprise first and second endmost layers, and at least one intermediate layer, wherein the processing nodes are programmed to operate the configuration to transmit data along each of a plurality of one dimensional paths formed by respective sets of processing nodes and links, each one dimensional path having a first portion between the first and second endmost layers using all processing nodes in one of the faces of the configuration only once, and a second portion provided between the second and first endmost layers and comprising one of the edges of the configuration.

In one embodiment the multi-face prism has three processing nodes in each layer, providing three respective faces for the first portion of respective one-dimensional paths.

In some embodiments in the at least one intermediate layer each processing node is connected to its neighbouring processing node by two interlayer links.

In the first and second endmost layers each processing node may be connected to its neighbouring processing node by three interlayer links to enable the simultaneous transmission of data on three one dimensional paths in the configuration.

The computer may be configured from a multi-face prism comprising a set of stacked layers, the processing nodes of each stacked layer having an interlayer link to a corresponding processing node in an adjacent stacked layer and an interlayer link between neighbouring processing nodes in the layer, by disconnecting each interlayer link in a designated stacked layer and connecting it to a neighbouring processing node in the designated stacked layer to provide an intralayer link whereby the designated stacked layer forms one of the first and second endmost layers.

Each of the processing nodes may be programmed to identify one of their interlayer and intralayer links to transmit data in order to determine the one-dimensional path for that data.

This can be achieved by a local node level program containing an appropriate instruction to define a data transmission stage.

Each of the processing nodes may be programmed to deactivate any of its interlayer and intralayer links which are unused in a data transmission step.

Each processing node may be programmed to divide a respective partial vector of that node into fragments and to transmit the data in the form of successive fragments around each one-dimensional path.

The computer may be programmed to operate each path as a set of logical rings, wherein the successive fragments are transmitted along each logical ring in simultaneous transmission steps.

Each processing node may be configured to output a respective fragment on each of two links simultaneously.

Each processing node may be configured to reduce multiple e.g. two incoming fragments with multiple, e.g two respective corresponding locally stored fragments.

Each processing node may be configured to transmit fully reduced fragments on each of two links simultaneously in an Allgather phase of an Allreduce collective.

In some embodiments, some or all links are bi-directional, that is they can transmit data in both directions over the link, optionally at the same time.

Another aspect of the invention provides a method of generating a set of programs to be executed in parallel on a computer comprising a plurality of processing nodes connected in a configuration comprising a multi-face prism;

wherein each face of the prism comprises multiple stacked pairs of processing nodes, wherein the processing nodes of each pair are connected to each other by at least two interlayer links, and the processing node of each pair is connected to a corresponding processing node in an adjacent pair by at least one interlayer link wherein the corresponding processing nodes are connected by respective interlayer links to form respective edges of the configuration; and wherein each pair of processing nodes forms part of one of the layers of the configuration, each layer comprising multiple processing nodes, each processing node connected to their neighbouring processing nodes in the layer by at least one of the intralayer links to form a ring;

wherein the multiple stacked layers comprise first and second endmost layers, and at least one intermediate layer, the method comprising:

generating at least one data transmission instruction for each program to define a data transmission stage in which data is transmitted from the processing node executing that program, wherein the data transmission instruction comprises a link identifier which defines an outgoing link on which data is to be transmitted in that data transmission stage; and determining the link identifiers in order to transmit data along each of a plurality of one dimensional paths formed by respective sets of processing nodes and links, each one dimensional path having a first portion between the first and second endmost layers using all processing nodes in one of the faces of the configuration only once, and a second portion provided between the second and first endmost layers and comprising one of the edges of the configuration.

In some embodiments each program comprises one or more instruction to deactivate any of its interlayer and intralayer links which are unused in a data transmission step.

In some embodiments each program comprises one or more instruction to divide a respective partial vector of the processing node on which that program is executed into fragments and to transmit the data in the form of successive fragments over the respectively defined link.

In some embodiments each program comprises one or more instruction to output a respective fragment on each of two links simultaneously.

In some embodiments each program comprises one or more instruction to reduce multiple, e.g two incoming fragments with multiple, e.g two respective corresponding locally stored fragments.

In some embodiments each program comprises one or more instruction to transmit fully reduced fragments on each of two links simultaneously in an Allgather phase of an Allreduce collective.

Another aspect of the invention provides a method of executing a set of programs in parallel on a computer comprising a plurality of processing nodes connected in a configuration comprising a multi-face prism;

wherein each face of the prism comprises multiple stacked pairs of processing nodes, wherein the processing nodes of each pair are connected to each other by at least two intralayer links, and the processing node of each pair is connected to a corresponding processing node in an adjacent pair by at least one interlayer link wherein the corresponding processing nodes are connected by respective interlayer links to form respective edges of the configuration; and wherein each pair of processing nodes forms part of one of the layers of the configuration, each layer comprising multiple processing nodes, each processing node connected to their neighbouring processing nodes in the layer by at least one of the intralayer links to form a ring;

wherein the multiple stacked layers comprise first and second endmost layers, and at least one intermediate layer, the method comprising:

executing at least one data transmission instruction in each program to define a data transmission stage in which data is transmitted from the processing node executing that program, wherein the data transmission instruction comprises a link identifier which defines an outgoing link on which data is to be transmitted in that data transmission stage;

the link identifiers having been determined in order to transmit data along each of a plurality of one dimensional paths formed by respective sets of processing nodes and links, each one dimensional path having a first portion between the first and second endmost layers using all processing nodes in one of the faces of the configuration only once, and a second portion provided between the second and first endmost layers and comprising one of the edges of the configuration.

In some embodiments executing the programs operates each path as a set of logical rings, wherein successive fragments of a partial vector provided at each processing node are transmitted around each logical ring in simultaneous transmission steps.

BRIEF DESCRIPTION OF THE DRAWINGS

For a better understanding of the present invention to show how the same may be carried into effect, reference will now be made by way of example to the accompanying drawings.

DETAILED DESCRIPTION

Aspects of the present invention have been developed in the context of a multi-tile processor which is designed to act as an accelerator for machine learning workloads. The accelerator comprises a plurality of interconnected processing nodes. Each processing node may be a single multi-tile chip, a package of multiple chips, or a rack of multiple packages. The aim herein is to devise a machine which is highly efficient at deterministic (repeatable) computation. Processing nodes are interconnected in a manner which enable collectives, especially broadcast and Allreduce, to be efficiently implemented.

One particular application is to update models when training a neural network using distributed processing. In this context, distributed processing utilises multiple processing nodes which are in different physical entities, such as chips or packages or racks. That is the transmission of data between the processing nodes requires messages to be exchanged over physical links.

The challenges in developing a topology dedicated to machine learning differ from those in the general field of high performance computing (HPC) networks. HPC networks usually emphasise on demand asynchronous all-to-all personalised communication, so dynamic routing and bandwidth over provisioning are normal. Excess bandwidth may be provisioned in a HPC network with the aim of reducing latency rather than to provide bandwidth. Over provisioning of active communication links waste power which could contribute to compute performance. The most common type of link used in computing today draws power when it is active, whether or not it is being used to transmit data.

The present inventor has developed a machine topology which is particularly adapted to MI workloads, and addresses the following attributes of MI workloads.

In MI workloads, inter chip communication is currently dominated by broadcast and Allreduce collectives. The broadcast collective can be implemented by a scatter collective followed by an Allgather collective, and the Allreduce collective can be implemented by a reduce-scatter collective followed by an Allgather collective. In this context, the term inter-chip denotes any communication between processing nodes which are connected via external communication links. As mentioned, these processing nodes may be chips, packages or racks.

Note that the communication links could be between chips on a printed circuit board, or between chips on different printed circuit boards.

It is possible to compile the workloads such that within an individual intelligence processing unit (IPU) machine, all-to-all communication is primarily inter-chip.

Figure 2:
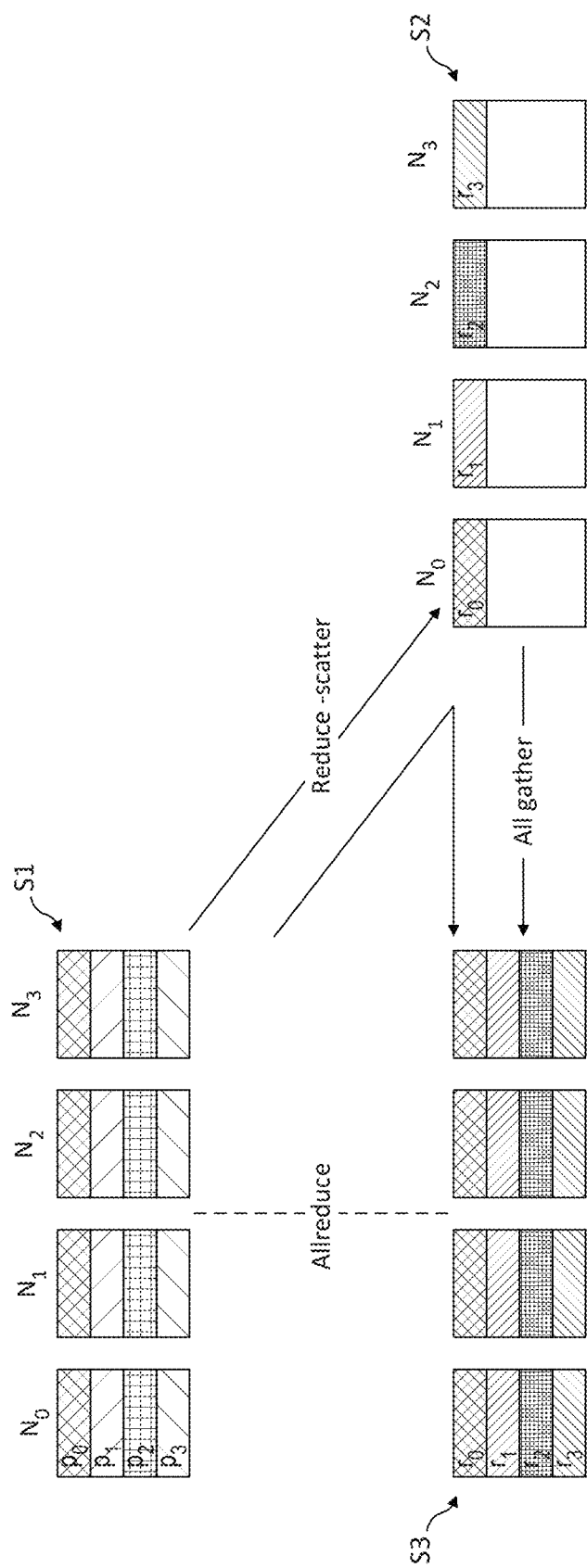
FIG. 2 is a schematic diagram illustrating implementation of an Allreduce function by a reduce-scatter step followed by Allgather step.

The Allreduce collective has been described above and is illustrated in FIG. 2. FIG. 2 shows a set of partial values or "partial" vector $P_0$, $P_1$, $P_2$, $P_3$ on each of four nodes in a starting state S1. In this context a node is a processing node in a network of processing nodes. Note that each node $N_0$, $N_1$, $N_2$, $N_3$ has four "corresponding" partials which are marked accordingly (large diamond grid, wide downward diagonal stripe, large square grid, wide upward diagonal stripe). That is, each partial has a position in its partial vector such that $P0(n)$ has the same position in its vector on node n as P0 (n+1) in its vector on node n+1. The suffix (n) is used to denote the node in which the partial resides—thus P0(0) is the partial P0 on node N0. In a reduce-scatter pass, corresponding partials are reduced and the reduction provided to one of the nodes. For example, partials P0(0), P0(1), P0(2), P0(3) are reduced (to $r_0$) and placed onto node $N_0$. Similarly, partials P1(0), P1(1), P1(2) and P1(3) are reduced (to $r_1$) and placed onto node N. And so forth so that in an intermediate state S2, each node has one of the reductions $r_0$, $r_1$, $r_2$ and $r_3$. As explained, the reduction may be by any combinatoral function $f(Pi_0^3)$—which could include independent operators (e.g. max) or associative operators=P1(0) *P1(1)*P1(2)*P1(3). Then, in an Allgather pass, each reduction is provided to all nodes to activate a state S3 wherein each node now holds all four reductions. Note that in S1, the "corresponding" partials, e.g. P0(0), P0(1), P0(2) and P0(3) may all differ whereas, in state S3, each reduction, e.g. $r_0$, is the same at all nodes, where $r_i = f\{(P_i(0), P_i(1), P_i(2)$ and $P_i(3))\}$. In machine learning, the set of partials P0, P1, P2, P3 is a vector. A vector of partials (e.g. updated weights) is produced on each pass of the model during training. The reduction $r_0$, $r_1$, $r_2$, $r_3$ on diamond grid, downward diagonal stripe, square grid, upward diagonal stripe each node in state S3 is the full reduction vector that is the vector of "results" or fully reduced partials. In the context of machine learning, each partial could be an updating delta for a parameter in the model. Alternatively (in an arrangement not described further herein) it could be an updated parameter.

Figure 3A:
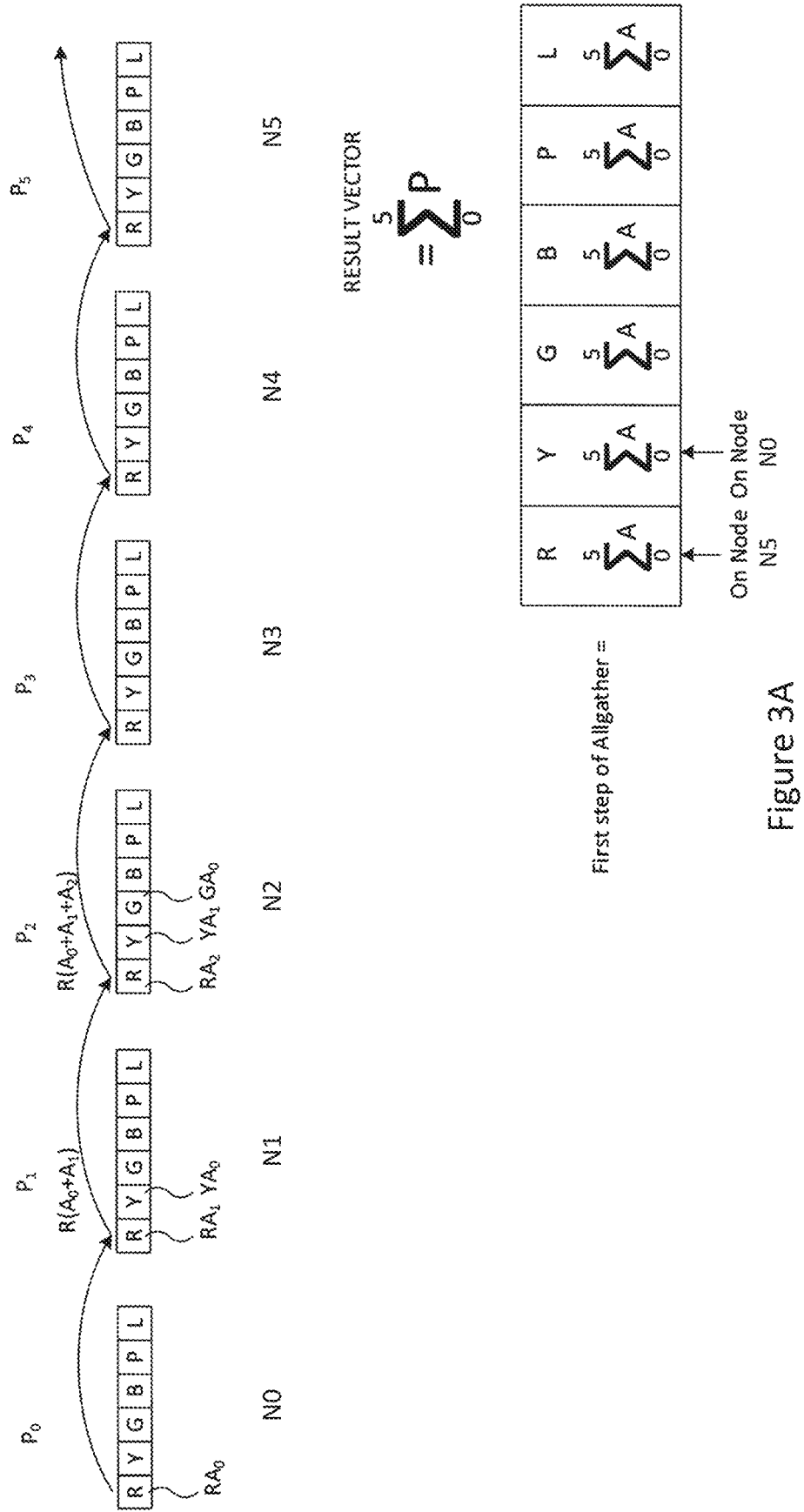
FIGS. 3A and 3B illustrate a bucket based Allreduce algorithm.
Figure 3B:
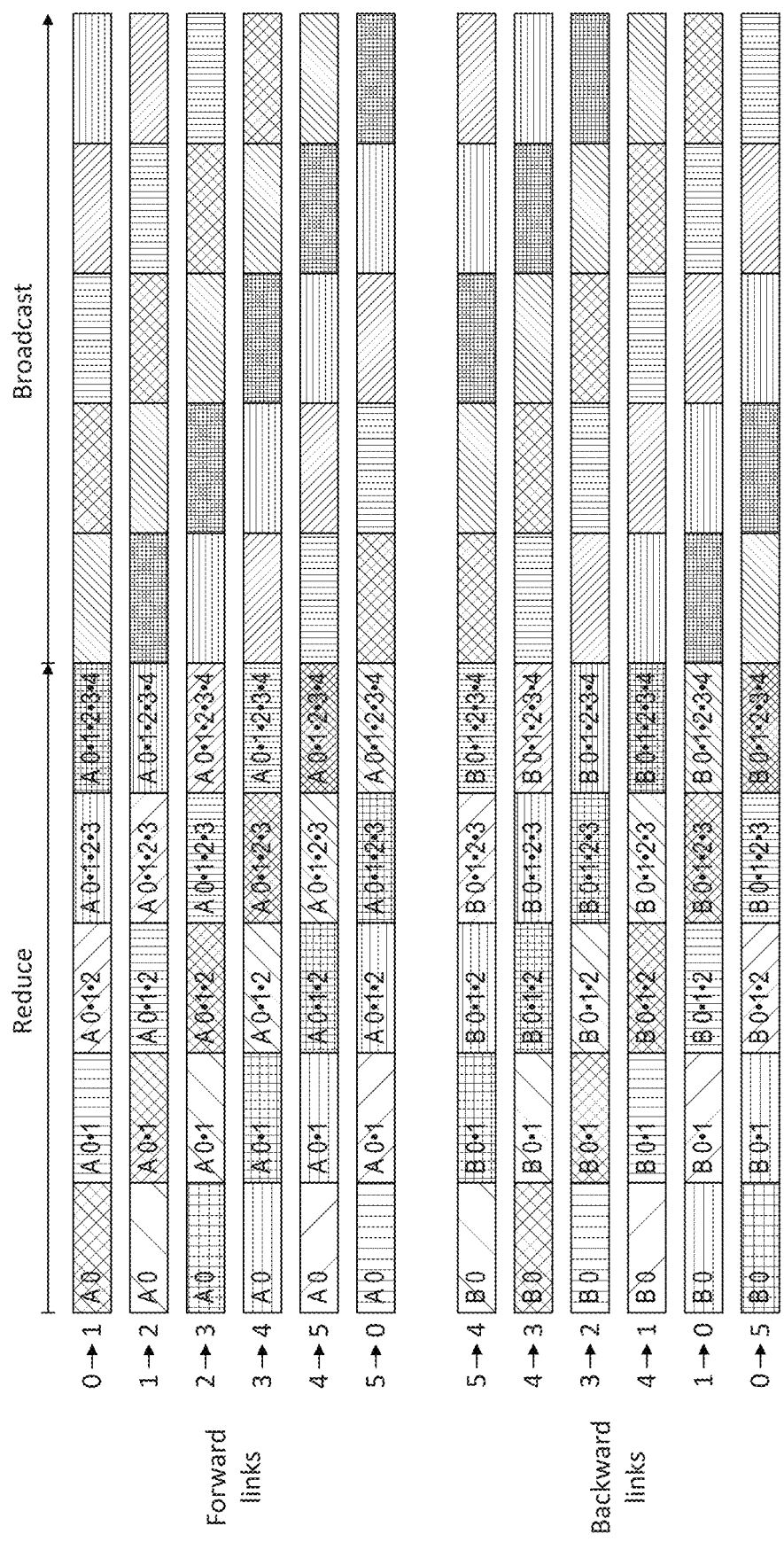

FIGS. 3A and 3B illustrate a bucket based algorithm for reduce-scatter/Allgather that assumes six "virtual rings. These are also termed "logical" rings herein. FIG. 3A is a schematic diagram illustrating the reduction of partials in multiple virtual rings. Each partial is split into six fragments. In FIG. 3A, the capital letters R, Y, G, B, P, L each denote a different fragment of a partial stored at each node, indicated by hatching diamond grid, upward diagonal stripe, square grid, horizontal stripe, downward diagonal stripe, vertical stripe. The letters denote corresponding fragments which are to be reduced with each other, and define the "virtual" or "logical" ring for those fragments. Looking at FIG. 3A, the "R" fragments in each of the partials P0, P1, P2, P3 and P4 are reduced into a single fragment in the result vector ($R\Sigma A_0^5$). Similarly for the Y, G, B, P and L fragments.

FIG. 3B shows a timing diagram with time on the horizontal axis indicating the data exchanges and computations in each step of the Allreduce process. In FIGS. 3A and B, the Allreduce process is accomplished by a reduce-scatter phase followed by an Allgather phase. In FIG. 3B each of the fragments are denoted by different hatching as follows: R—diamond grid, Y—upward diagonal stripe, G—square grid, B—horizontal stripe, P—downward diagonal stripe, L—vertical stripe.

The notation in FIGS. 3A and 3B is as follow. The partials are each denoted P0, P1, P2, P3, P4, P5. At the start of the process, each partial is stored on a respective node N0, N1, N2, N3, N4, $N_5$. Each fragment is labelled according to its fragment ordinant and its position in the virtual ring in which it is deemed to be reduced. For example, RA0 denotes the R fragment in partial P0, because this is the first fragment in a virtual ring formed by nodes N0-N1-N2-N3-N4-N0. RA1 denotes the R fragment at node N1, which is in the second position in its virtual ring. YA0 denotes the Y fragment at node N1. The "0" suffix indicates it is the first fragment in its virtual ring, the Y-ring being N1-N2-N3-N4-N0-N1. Note in particular that the suffixes on A reflect the virtual rings, and do not correspond to the physical nodes (or the partials). Note that FIG. 3A shows only the virtual rings on the forward links. FIG. 3B shows that an equivalent process is occurring on the backward links, with the fragments denoted as B.

In step one, the first fragment (the A0) in each virtual ring is transferred from its node to the next adjacent node where it is reduced with the corresponding fragment at that node. That is, RA0 moves from N0 to N1 where it is reduced into R(A0+A1). Once again, the "+" sign is used here as a shorthand for any combinatorial function. Note that in the same step the A0 fragments of each virtual ring will simultaneously be being transmitted. That is, the link between N1 and N2 is used to transmit YA0, the link between N2 and N3 is used to transmit GA0 et cetera. In the next step, the corresponding reduced fragments are transmitted over the forward links to their next adjacent node. For example, R(A0+A1) is transmitted from N1 to N2, and Y(A0+A1) is transmitted from N2 to N3. Note that for reasons of clarity not all fragments are numbered, nor are all transmissions numbered in FIG. 3A. The full set of fragments and numbers are shown in FIG. 3B. This process carries on for five steps. After five steps, there is a reduction of all fragments on each node. At the end of the fifth step, this reduction is on the last node of each corresponding ring for that fragment. For example, the R reduction is on node N5.

The beginning of the Allgather phase starts by a transmission from the last to the first node in each virtual ring. Thus, the final reduction for the R fragments ends on node N5 ready for the first step of the Allgather phase. The final reduction of the Y fragments correspondingly ends up on the node N0. In the next step of the Allgather phase, the reduced fragments are transmitted again to their next adjacent node. Thus the fully reduced R fragment is now also at N2, the fully reduced Y fragment is now also at N3 and so on. In this way, each node ends up at the end of the Allgather phase with all fully reduced fragments R, Y, G, B, P, L of the partial vector.

Implementation of the algorithm is optimal if the computation required for the reduction can be concealed behind the pipeline latency. Note that in forming suitable rings in a computer for implementation of Allreduce, a tour of the ring must visit each node in the ring only once.

Figure 1:
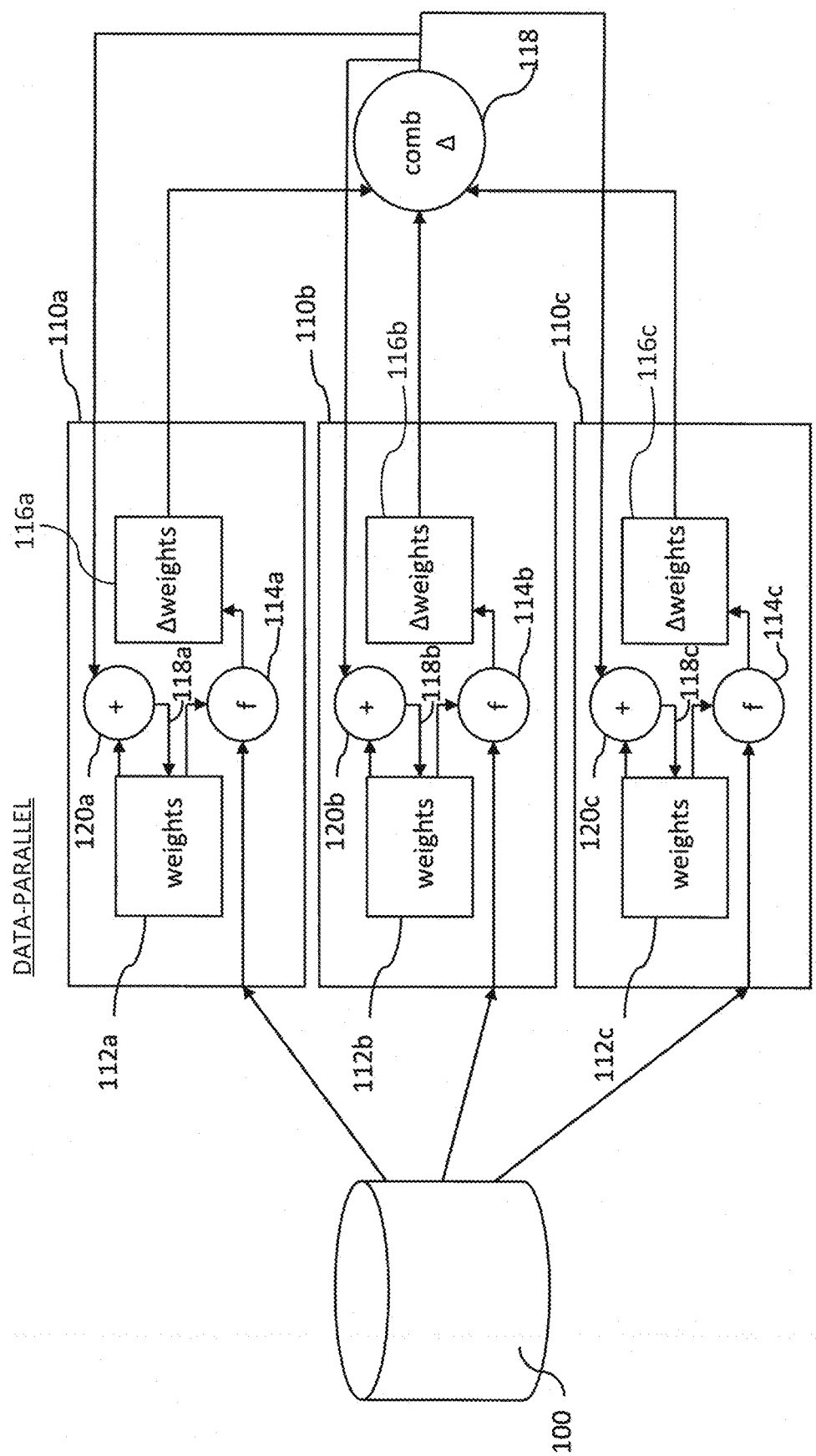
FIG. 1 is a schematic diagram illustrating distributed training in a neural net.
Figure 1A:
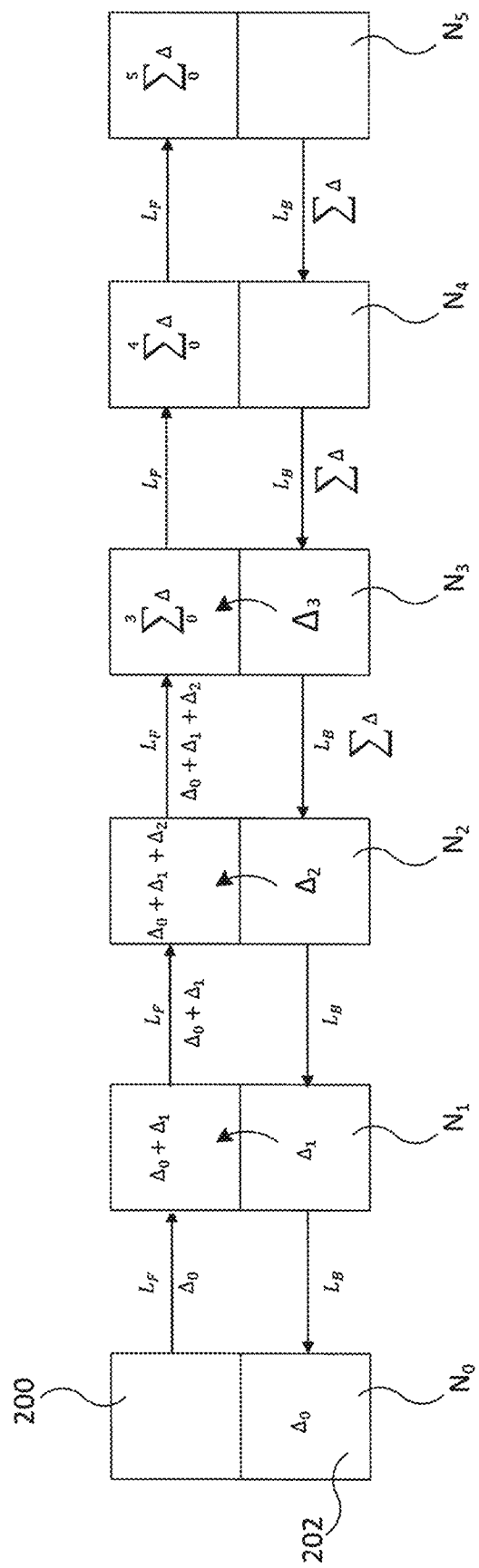
FIG. 1A is a schematic diagram showing a line of processing nodes for implementing a simple "streaming" line Allreduce algorithm.
Figure 1B:
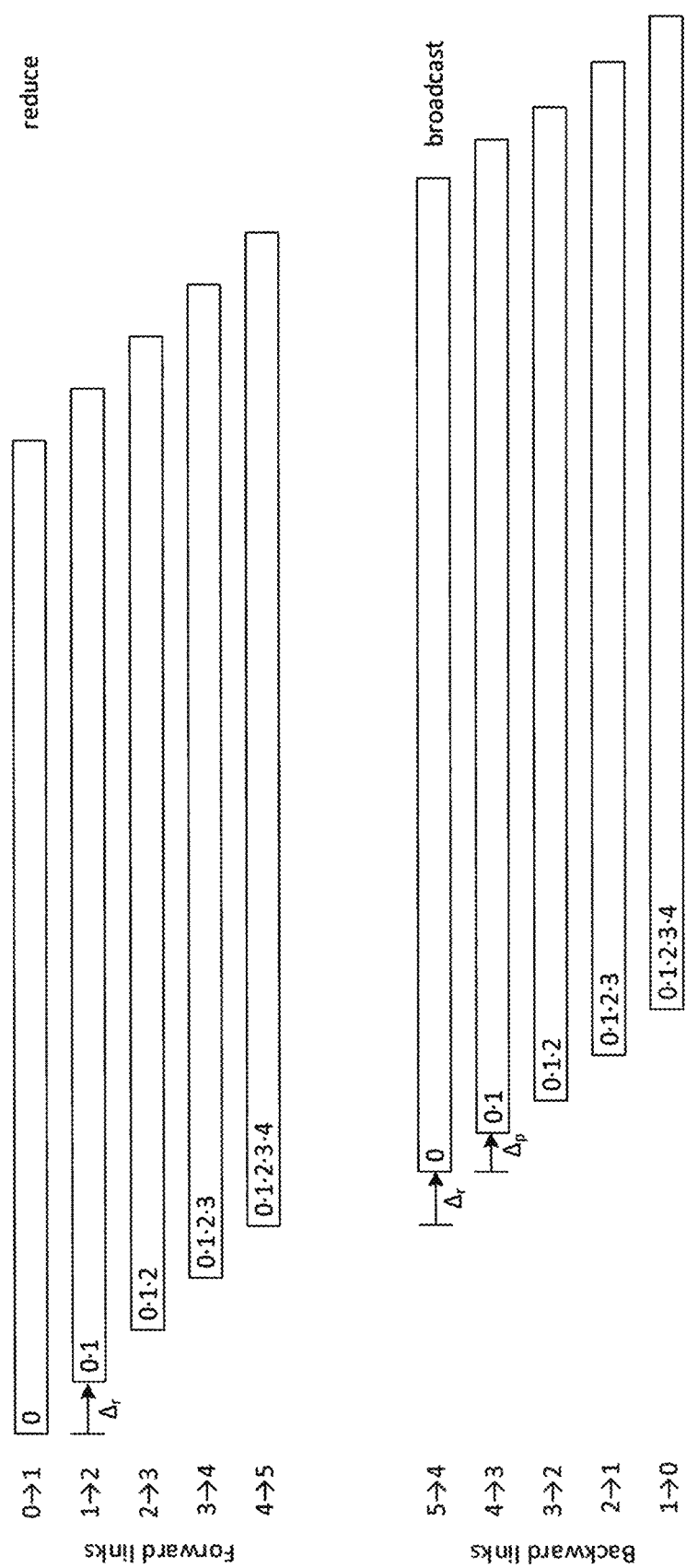
FIG. 1B is a timing diagram of a "streaming" line Allreduce algorithm.
Figure 1C:
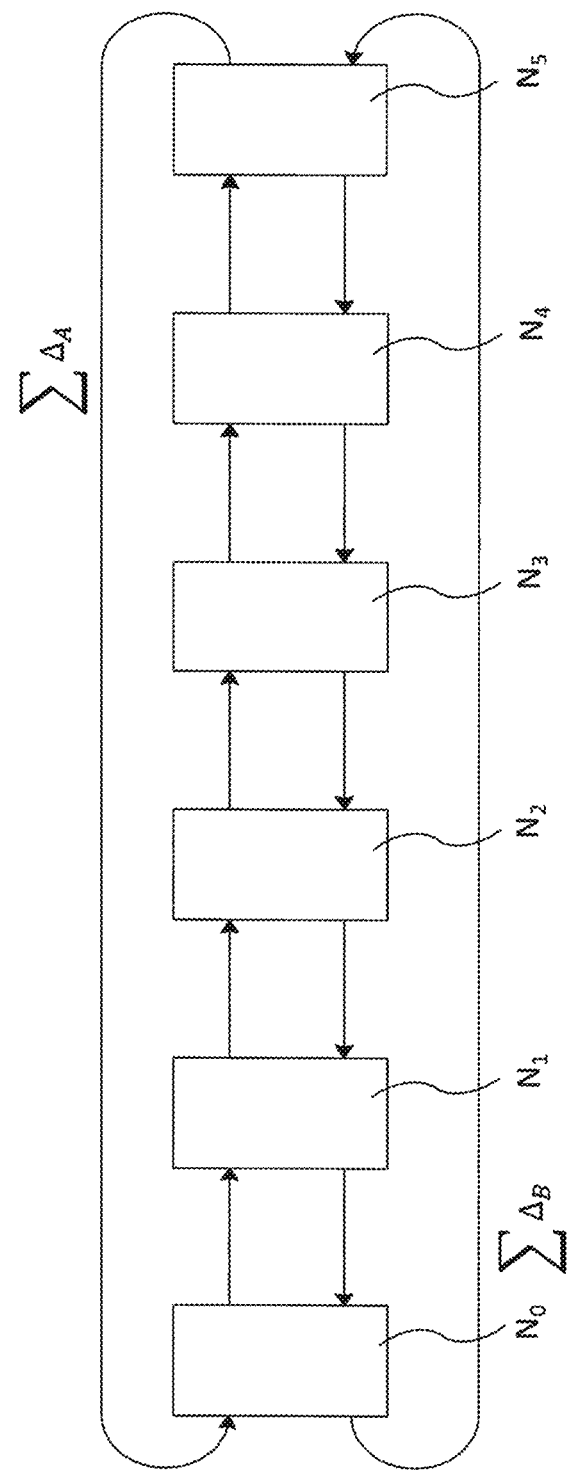
FIG. 1C is a schematic diagram of a line with the end nodes connected into a ring.
Figure 1D:
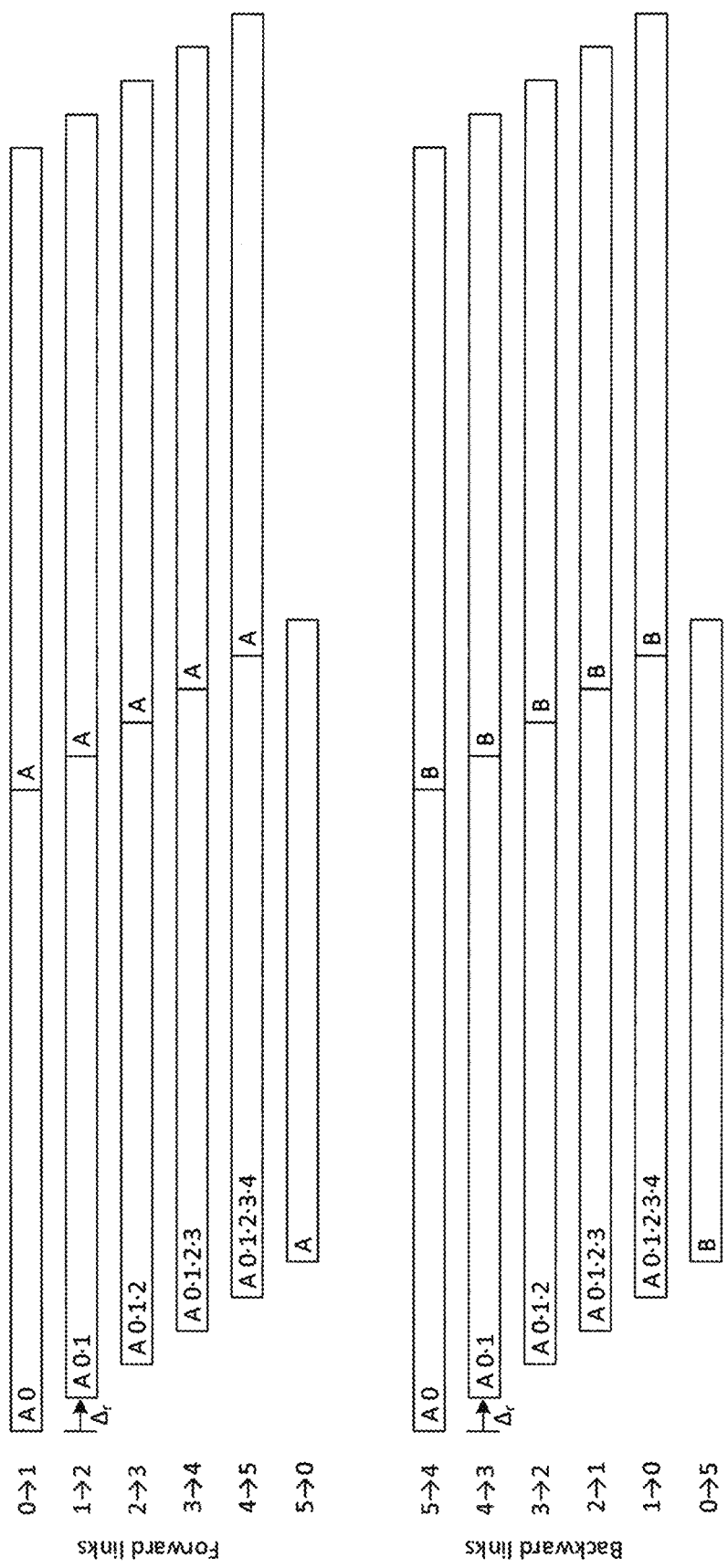
FIG. 1D is a timing diagram of a ring Allreduce algorithm.

Therefore the natural ring formed by a line with bi-directional links (FIG. 1A) is not the most efficient ring.

There will now be described an improved topology for an interconnected network of processing nodes which permits an efficient exchange of partials and results between processing nodes to implement an Allreduce collective.

Figure 4A:
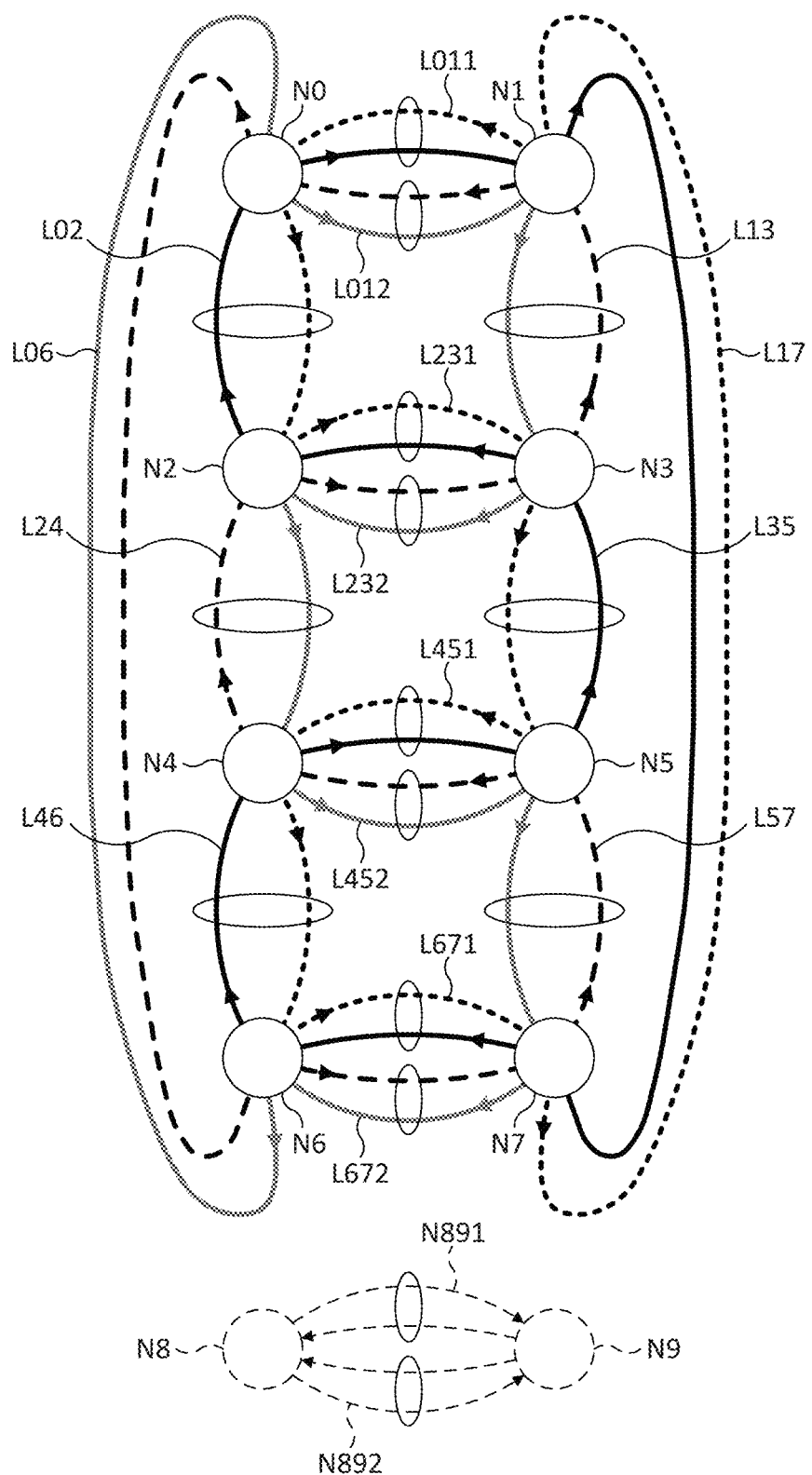
FIGS. 4A and 4B are schematic diagrams of a configuration of processing nodes in which two rings are embedded.

FIG. 4A is a schematic diagram showing a connected topology of multiple processing nodes. In FIG. 4A, there are eight processing nodes in a ladder formation, but it will be appreciated that the principles could be extended to any number of pairs of processing nodes arranged in a ladder. Each processing node is shown as a circle and labelled with a number for ease of reference. In the following description, the prefix N will be inserted when referring to a node. For example, N0 denotes the circle representing node N0 in FIG. 4A. The processing nodes are connected by links in a manner to be described. Each link may be bi-directional, that is, it may transport data in both directions over the links. Note that there is a physical interconnectivity, and a logical connectivity. The logical connectivity is used to form two embedded, continuous rings, each having two directions. Firstly, the physical connectivity will be described. Processing nodes in the Y direction are each connected to their neighbouring node by a single bidirectional link. Facing processing nodes are connected by two bi-directional links. For example, (looking at the left hand vertical in FIG. 4A), N0 is connected to N2 by a single bi-directional link (shown as two oppositely facing arrows in FIG. 4). Similarly, N2 is connected to N4, N4 is connected to N6 and N6 is connected back to N0. In the horizontal direction, node N0 is connected to N1 by two bi-directional links (one of which is shown by opposing arrows in black and small dash, and the other of which is shown by opposing arrows in grey and large dash). Similarly N2 is connected to N3, N4 is connected to N5 and N6 is connected to N7. This physical connectivity allows two logical embedded rings (each bi-directional) to be embedded in the structure. The first ring (shown in grey and large dash) extends from N0 to N1, N1 to N3, N3 to N2, N2 to N4, N4 to N5, N5 to N7, N7 to N6 and back to N0. The second logical ring (shown in black and small dash) extends from N0 to N2, N2 to N3, N3 to N5, N5 to N4, N4 to N6, N6 to N7, N7 to N1 and from N1 back to N0. Each ring comprises all eight processing nodes. Note also that the two rings can be used simultaneously because there is no conflict on any single path.

Figure 4B:
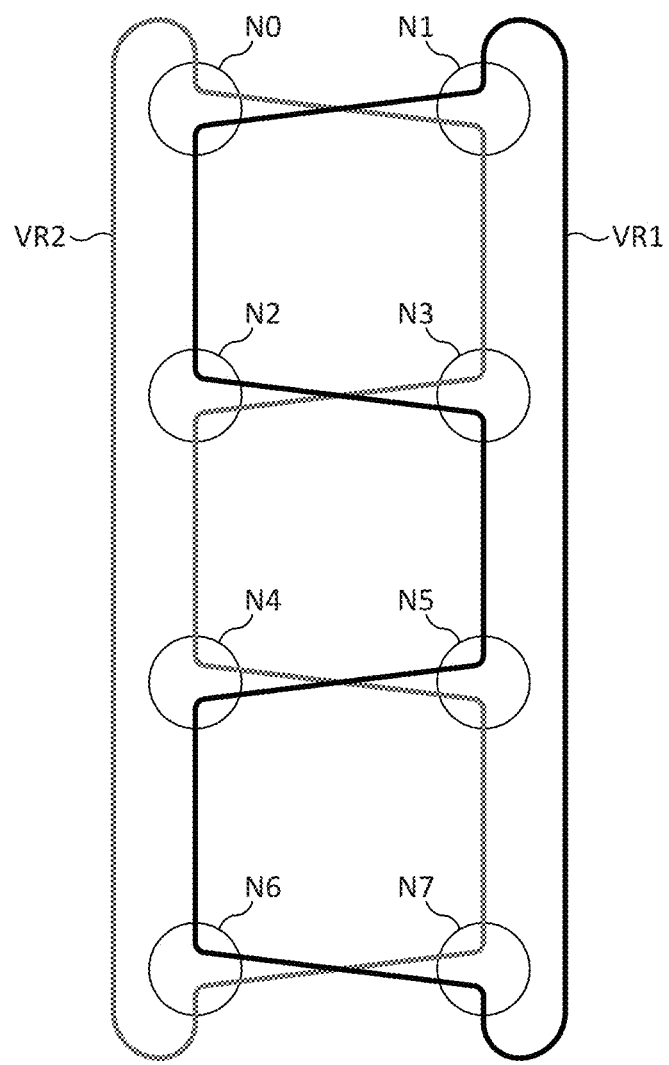

Consider node N0 in FIG. 4A and FIG. 4B. This node N0 has two links which connect it to a node N1 which is referred to as its facing pair node. These links are labelled L011 and L012. The designation of L01 is to indicate that the link connects nodes 0 and 1. The designation 1 indicates that it is the first link between nodes 0 and 1, and the designation 2 denotes that it is the second link between nodes N0 and N1. Note that in this embodiment each of the links are bidirectional. The node N0 also has a third bidirectional link which is labelled L02. This link L02 is connected to a corresponding node N2 in the next adjacent pair in the ladder configuration. The link L02 is referred to as a ladder connecting link for this reason. The node N0 has a fourth link labelled L06. This link connects corresponding nodes N0 and N6 in end pairs of the ladder configuration. In FIGS. 4A and 4B, the first end pair is the facing pair of nodes N0 and N1, and the second end pair are the facing nodes N6 and N7. Note that the processing nodes in the facing pair N6, N7 are similarly connected by two bidirectional links L671, L672.

The link L06 which extends between corresponding nodes of the end pairs (N0 and N6), and correspondingly link L17 which extends between nodes N1 and N7 are referred to ladder return links. The links enable each embedded ring in the ladder configuration to be a full one-dimensional ring.

The ladder configuration in the embodiment of FIG. 4 comprises two intermediate facing pairs, N2/N3 and N4/N5. The facing nodes in each pair are connected by corresponding links L231, L232; L451, L452.

Corresponding nodes in the facing pairs are connected through ladder connecting links. For example, the node N1 in the first end pair is connected to the node N3 and its adjacent intermediate pair by link L13. In FIGS. 4A and 4B, each link is shown by two bidirectional arrows. These may, however, be accommodated in a single physical link structure, and denote the bidirectional communication paths over that physical link structure. In alternative embodiments, each direction of a link structure may be a separate physical manifestation.

In the embodiment of FIGS. 4A and 4B, four facing pairs of eight nodes in total form a ladder configuration. It will readily be appreciated that the ladder configuration may be simply extended to include further facing pairs. This may be done by changing the connectivity of the links on the nodes in the end pair. For example, to add another facing pair to the ladder configuration, the link L06 is disconnected from node N0 and connected to a further node N8 (shown in dotted). This node N8 has its own physical link which is then connected as the ladder return link to node N0. Similarly, the link L17 extending from node N7 to node N1 is disconnected from node N1 and connected to a new node N9 (shown in dotted). A physical link from N9 is then connected as the ladder return link to node N1. The nodes N8 and N9 are connected together by physical links N891 and N892.

Further pairs of nodes may be added to the ladder configuration as needed to expand the processing capability of the computer. Note that when the new nodes are added, there is no need to interrupt the existing connectivity for the other pairs of nodes in the ladder configuration, apart from the end pair. This greatly simplifies extension of the ladder configuration to include additional processing nodes as desired.

The embedded rings in the ladder configuration may be considered "barley twist" rings due to their appearance as shown in FIG. 4B, labelled VR1,VR2. It is emphasised that the ring shown in FIG. 4B are the virtual data transmission rings which are embedded in the ladder configuration. These rings can operate simultaneously, as no link is used twice in different conflicting rings.

In order to use this structure, the partial (or fragment) to be transmitted is split into two parts at each node, and each part is all reduced around one of the rings using the one-dimensional ring algorithm which has been described above the reference to FIGS. 3A and 3B. Each node outputs $$\frac{n-1}{n}(v)$$

size of fragment, where N is the number of nodes, and V is the size of the data structure that is being reduce-scattered or Allgathered in a particular phase. At the beginning, V is the size of the partial vector. The number of fragments equals the number of nodes in the ring before each step around the ring. Note that in comparison with the structure described in the Jain paper, the rings pass through all nodes, and all links are used all of the time. It is assumed herein that each processing node can output its data on two links simultaneously, and can receive and process data simultaneously. Each ring is one-dimensional—it is a non-branched chain of processing nodes.

Figure 5A:
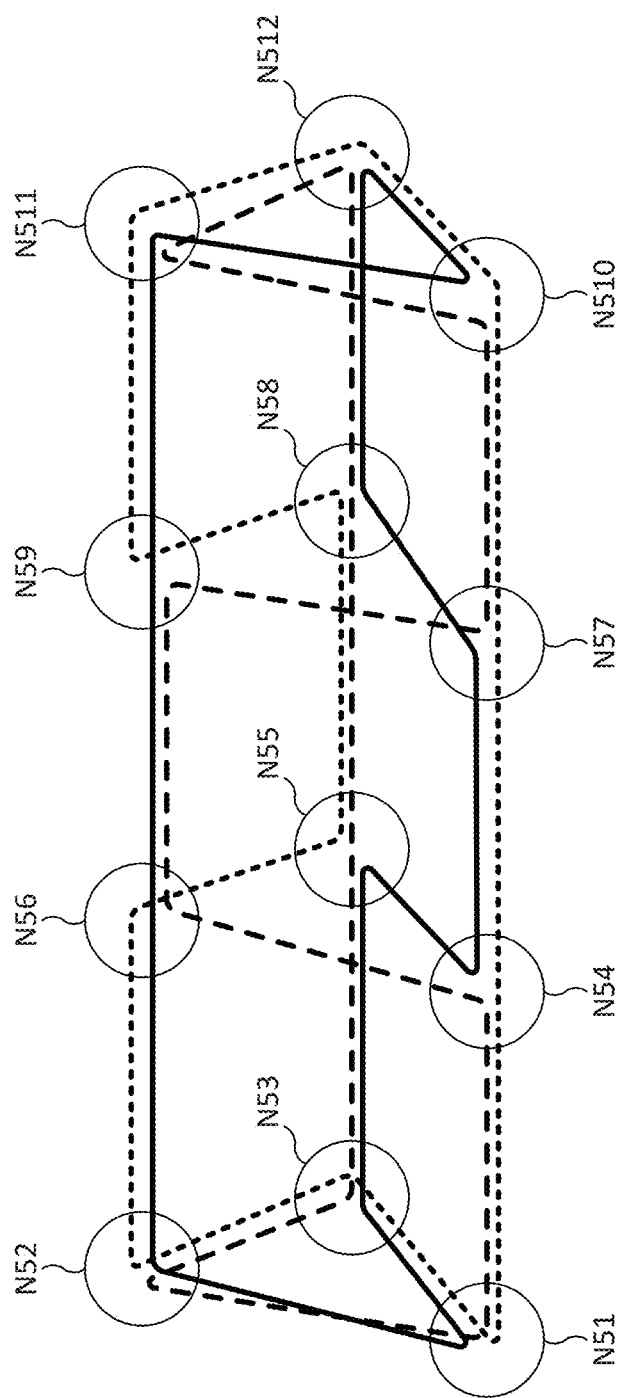
FIGS. 5A and 5B is a schematic diagram of an alternate ("triangular") configuration of processing nodes in which three rings are embedded.
Figure 5B:
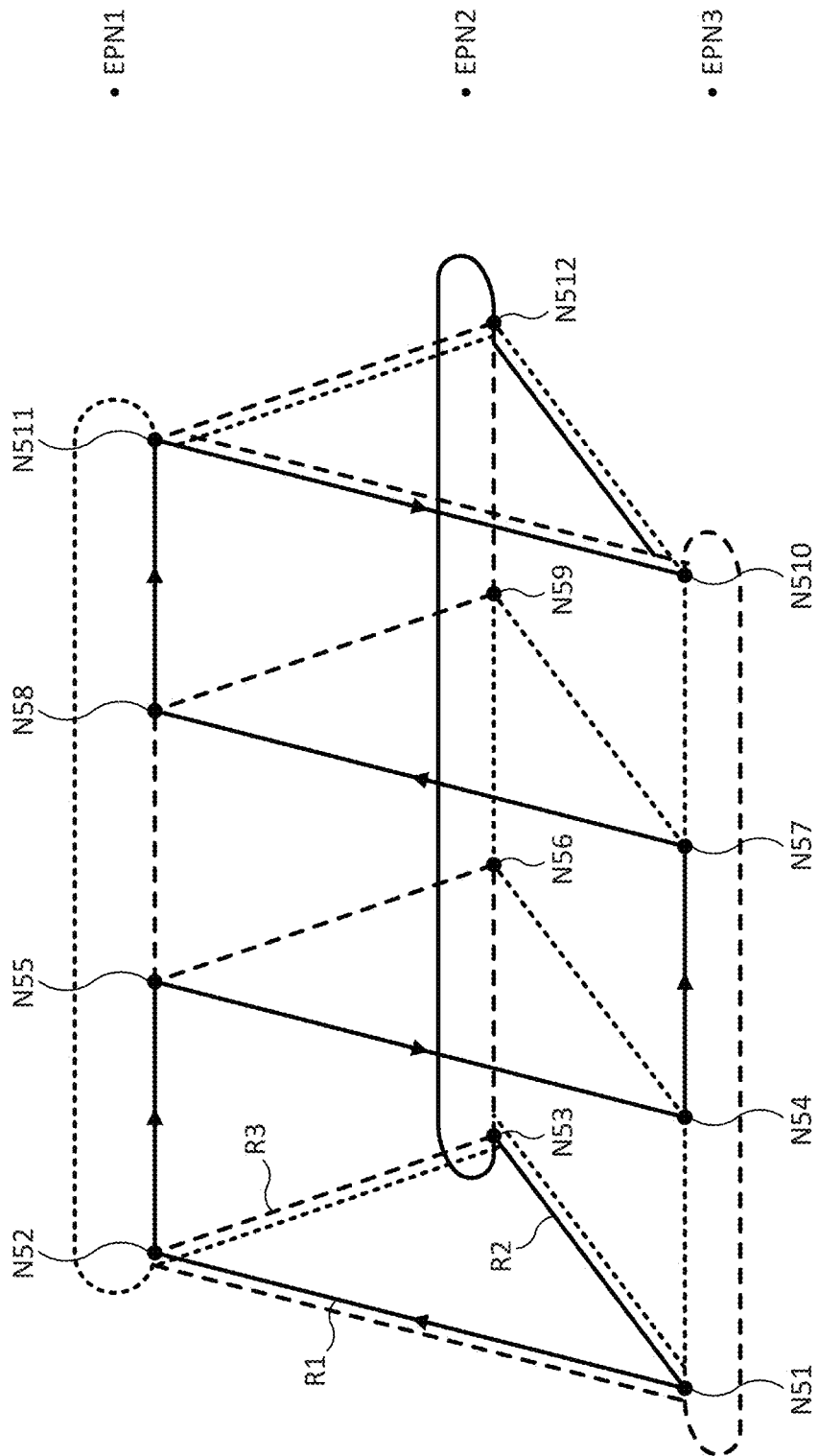

According to another configuration of embedded one-dimensional rings, a configuration is provided with multiple stacked layers. A configuration is shown in FIGS. 5A and 5B, which is a three-dimensional view and FIG. 6, which is an expanded view showing the connectivity. There is a physical connectivity and a logical connectivity which will both be described. According to the physical connectivity (FIG. 6), the configuration comprises multiple stacked layers—the stack shown from left to right in the Figures, rather than in the vertical direction. The orientation of the stacking is not relevant, although it is noted that in practical configurations where processing units may be arranged in server racks, stacking in a vertical configuration corresponding to the server racks can be useful.

Figure 6:
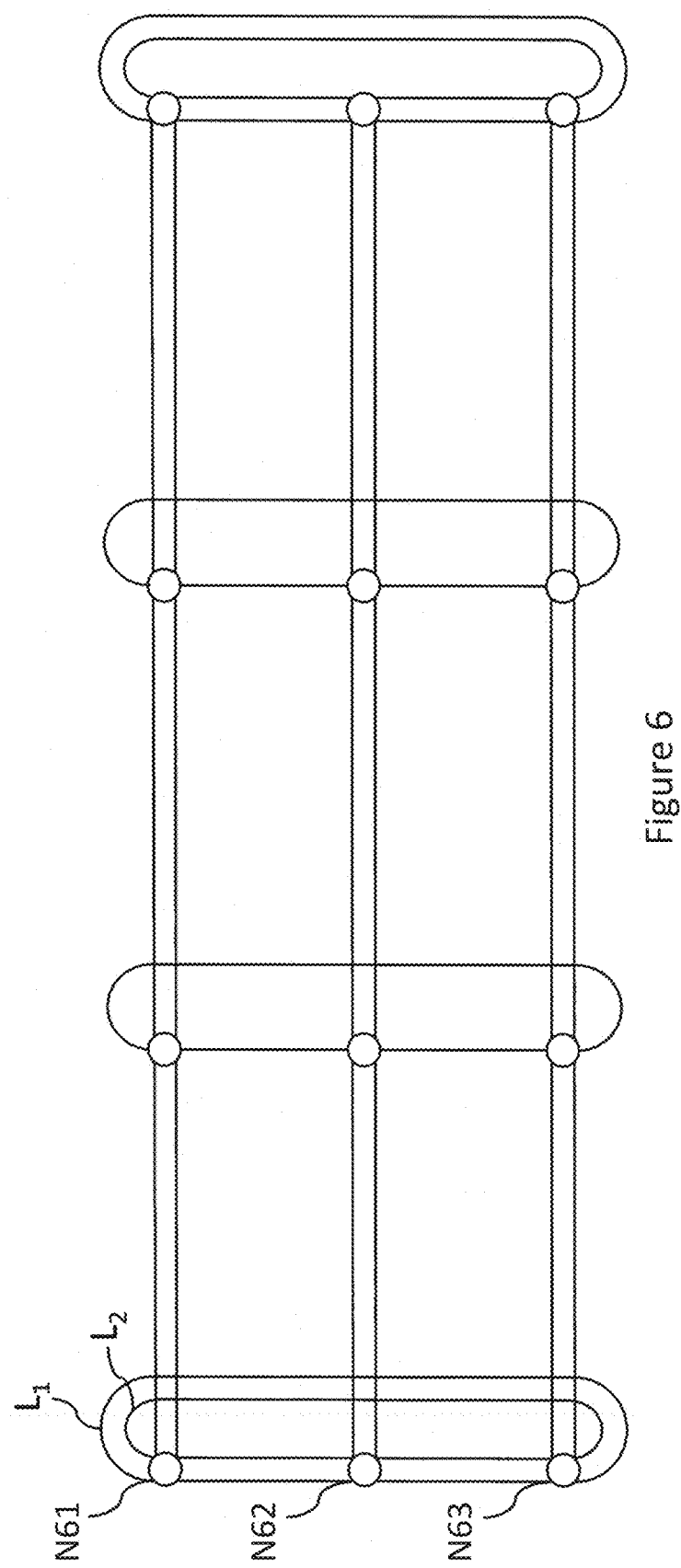
FIG. 6 is a schematic diagram illustrating the rings embedded in the structure of FIG. 5.

Each layer comprises three processing nodes which are shown in the left hand most layer in FIG. 6 as N61, N62 and N63. These processing nodes are connected in a ring wherein each processing node is connected to its adjacent processing node by two links L1, L2. These links may each be bi-directional. The right hand end most layer of the stack is also connected together by two links between nodes. The central layers of the stack are however connected only with single links. Connectivity by a link here means that the links are active and able to transmit data. There may be other inactive connections between the processing nodes, which do not form part of the operation of the configuration.

The configuration is operated to provide three embedded one-dimensional rings which can or operate at the same time. FIG. 5B shows this schematically, with the rings labelled R1, R2 and R3. R1 is shown in a full dark line, R2 is shown as a dotted line and R3 is shown as a dashed line. Considering the configuration as a cylinder of triangular cross-section, each flat face of the cylinder incorporates a one-dimensional embedded ring. For example, the ring R1 is formed by nodes N51, N52 (in the endmost layer), a link between N52 and N55 (between the layers) a link between N55 and N54 (within the next layer), a link between N54 and N57 (between layers), a link between N57 and N58 (within the next layer), a link between N58 and N511 between the layers, a link between N511 and N510 (in the right hand endmost layer), a link between N510 and N512 and a return link between N52 and N53, and back to N51.

Corresponding embedded rings can be found in each of the other two phases. Thus, each ring is formed of a link within each layer connected to a link between layers, and so on until the ring is complete. The rings (or paths) are described in more detail below), with reference to FIG. 5A.

In the first embedded path, node N51 is connected to node N53 along one side of the first endmost layer by the link between nodes N51 and N53. This is an intralayer link along one side of the first endmost layer. The path continues along a next side of the first endmost layer to node N52. The path then proceeds from node N52 to node N56 via an interlayer link. The path then proceeds from node N56 to N55 via another intralayer link on the same face of the configuration as nodes N52 and N56. The path extends down this face from node N55 to node N58 and then across the face along the intralayer link to node N57. The path proceeds from node N59 to node N511 along an interlayer link and then along an intralayer link from node N61 to node N512 from where it proceeds along an intralayer link from N512 to node N510 of the second end most layer. The intralayer links between nodes N511, N512 and N510 are sides of the second endmost layer. The path then proceeds along a return portion from node N510 to node N51 of the first end most layer. This path is shown by a small dashed line in FIG. 5A.

A second embedded path can also be shown commencing from node N51 shown in a solid black line. This path has a first portion along the "bottom" face of the configuration shown in FIG. 5A extending from node N51 to node N53, from node N53 to node N55, from node N55 to node N54, from node N54 to N57, from node N57 to N58, from node N58 to N512 and from node N512 up to node N511. A return second portion of the path is provided by the interconnecting link between node N511 of the second endmost layer and N52 of the first endmost layer.

A third embedded path can be shown starting at node N53 and extending along intralayer link to node N52; the third embedded path is shown in large dash. The path then proceeds along the rear face of the configuration shown in FIG. 5A from node N52 to N51, N51 to N54, N54 to N56, node N56 to N59, from node N59 to N57, from node N57 to N510, from node N510 to node N511 and from node N511 to N512. The path has a return portion from node N512 to N53.

Note that each path has a first portion which uses each of the nodes in one face of the configuration only once, and two "legs" of each of the endmost layers. Each path then has a return portion which passes directly between endmost layers, along an opposing edge of the configuration, using all processing nodes in the return portion.

The three embedded rings may operate simultaneously. If all of the links are capable of simultaneous bi-directional operation, six embedded rings may operate simultaneously.

The capacity of the computer may be extended by adding new layers of processing nodes. In order to do this, the interconnectivity of the processing nodes is altered. For example, consider the addition of an extra layer added on to the second endmost layer (the right-hand layer in FIG. 5A). One of the links from node N511 is disconnected and is connected to a corresponding processing node in an additional layer, the processing node shown labelled EPN1 (extra processing node 1). Similarly, one of the links from each of node N512 and node N511 is disconnected from their currently connected node and are connected to corresponding extra processing nodes labelled EPN2 and EPN3 respectively. Nodes EPN1, EPN2 and EPN3 are then themselves connected in a ring with respective link structures as in the other layers of the configuration. Note that the connectivity of the remaining part of the configuration remains the same. Layers may be added in this way to either end of the configuration stack.

Note that the paths taken around each layer (set of three nodes) of the triangular cylinder configuration is such that an extended triangular prism of layers of three processing nodes could be partitioned into different lengths, such that each partition could operate in a self-contained manner. This could be done by deactivating links between the layers of separate partitions. This is discussed in more detail later. Note that although in FIG. 5B the return portions are shown looping back, this is diagrammatic only. In one implementation each existing link between the individual processing nodes along an edge is utilised as part of the return portion, with the data values being passed through each processing node without further processing until it reaches the end most processing node.

In some embodiments, the reference to operating as a ring refers to the implementation of a one-dimensional algorithm as described above to implement the Allreduce collective. In the structure of FIGS. 5A, 5B and 6, all three rings can operate simultaneously, enabling the division of a partial vector at each node into three parts for simultaneous processing over three rings in the structure.

Figure 8A:
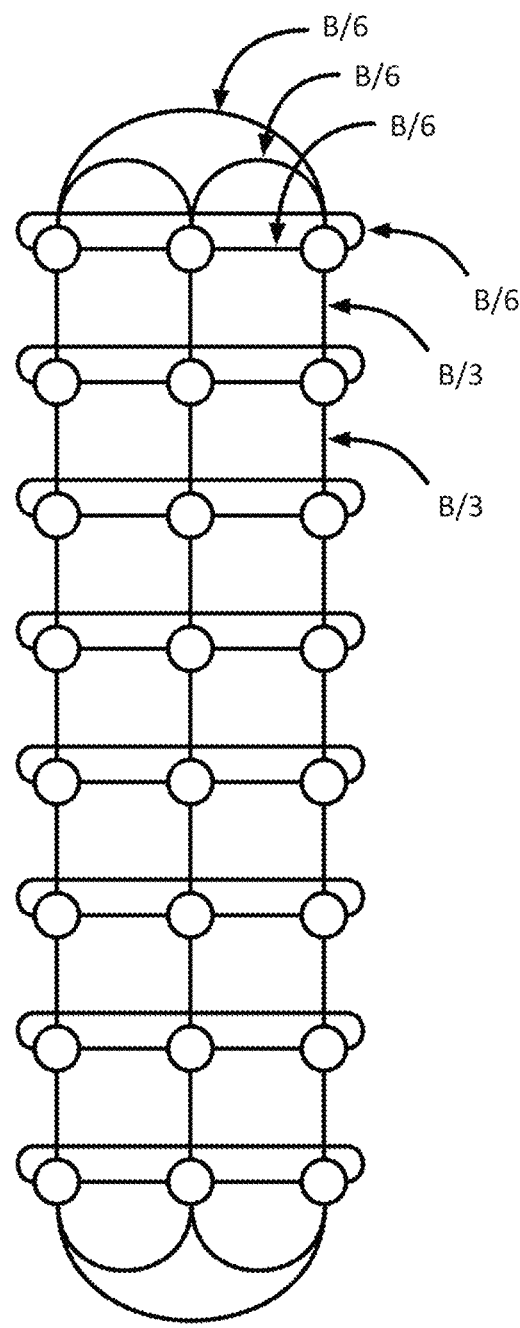
FIG. 8A illustrates a 3×8 triangular prism, with 1:2 bandwidth asymmetry.

FIG. 8A illustrates an embodiment with 24 processing nodes arranged in a 3×8 triangular prism with 1:2 bandwidth symmetry. The bandwidth utilisation is noted on the links. FIG. 8A shows the connectivity of the graph showing allocation of total node bandwidth B to each link. Note that the intralayer links have a bandwidth of B/6, and the interlayer links have a bandwidth of B/3

Figure 8B:
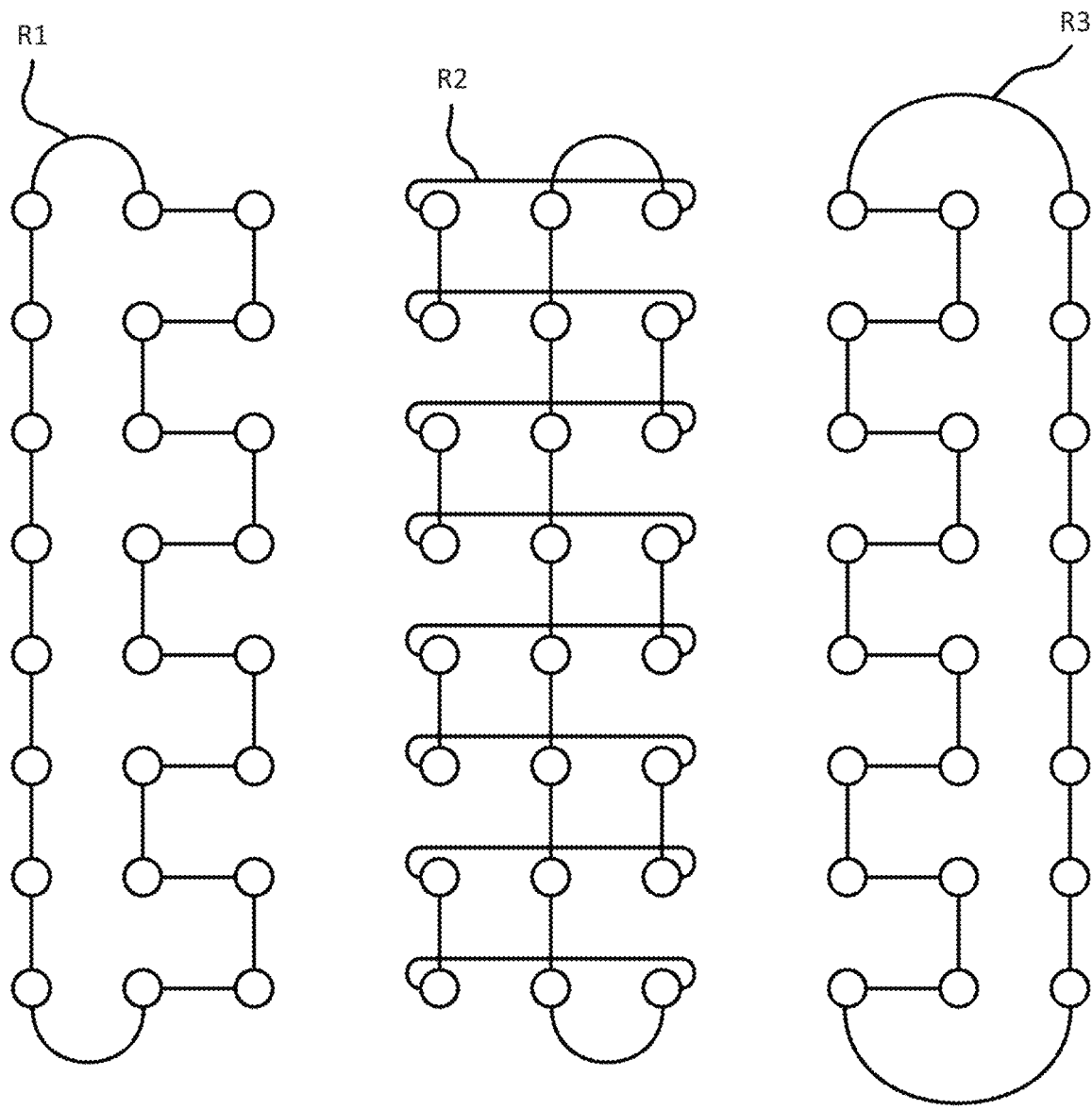
FIG. 8B shows three isomorphic embedded rings which can circulate concurrently on the graph, each using B/6 per link.

FIG. 8B illustrates three isomorphic embedded rings which can circulate concurrently on the structure. Each ring has a bandwidth utilisation of B/6 per link.

Figure 8C:
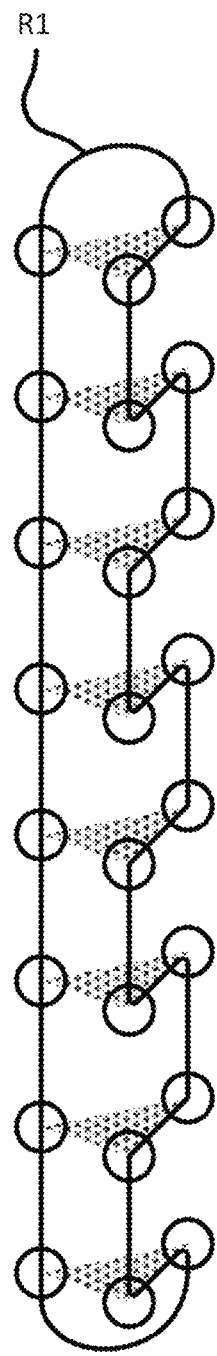
FIG. 8C is a 3D view, showing one of three embedded rings.

FIG. 8C is a three-dimensional view showing one of the 3 embedded rings. The ring R1 is shown in FIG. 8C. Note that the other two rings R2, R3 are the same rotated 120 degrees about the long axis.

Figure 7:
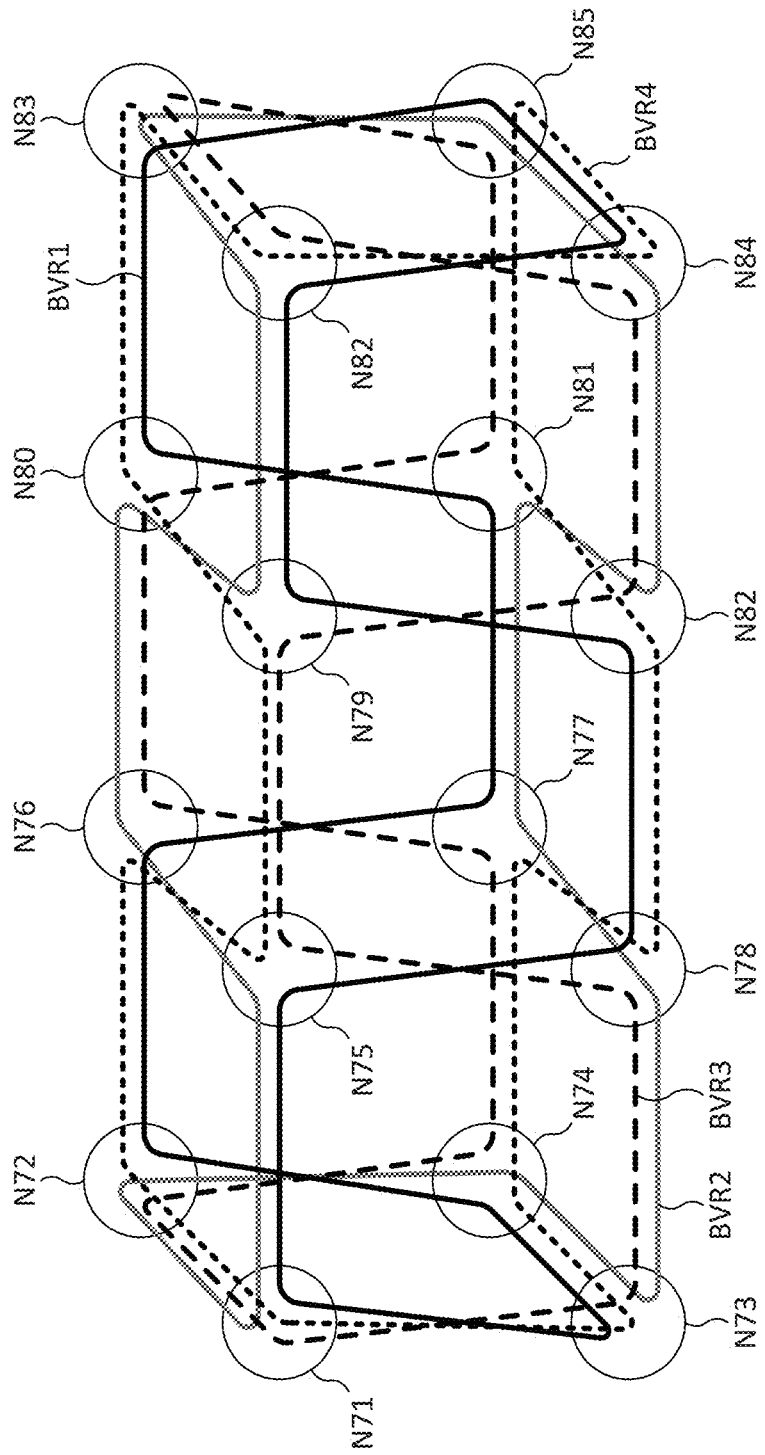
FIG. 7 is a schematic diagram of a further alternate ("box tube") configuration in which four rings are embedded.

According to another configuration, a "box tube" structure may be provided as illustrated in FIG. 7. Reverting to the "ladder" configurations of FIGS. 4A and 4B, a return portion of each path was provided in the direction perpendicular to the pairs (or runs) of the ladder. In the box-tube configuration shown in FIG. 7, the return portion of each path may be implemented by a ladder configuration on a rear face of a rectangular prism. That is, in the box-tube configuration, a front face may operate as the ladder of FIGS. 4A and 4B, and a rear face may operate as the ladder of FIGS. 4A and 4B, thus enabling four rings to be embedded as shown by respective colours in FIG. 7. Note that the paths taken around each layer (set of four nodes) of the box structure is such that an extended "tube" of layers of 2×2 processing nodes could be partitioned into different lengths, such that each partition could operate in a self-contained manner. This could be done by deactivating links between the layers of separate partitions.

Four virtual rings can be seen embedded in the "box tube" configuration shown in FIG. 7. These are labelled BVR1, BVR2, BVR3, BVR4 (representing box tube virtual ring). Note that this terminology is to distinguish the rings from virtual rings in the ladder configuration (VR) and virtual rings in the triangular configuration (R). However, the function and operation of the embedded rings is the same in all three structures.

A first embedded ring BVR1 operating starting at, for example, node N71 at the top left hand corner of the structure shown in FIG. 7. It passes from node N71 in a first endmost layer of four nodes (at the left hand end of the box structure shown in FIG. 7). The virtual ring BVR1 extends around three nodes of that layer, N73, N74 and N72. It then extends to a node in the next layer of four nodes, at node N76. It passes down one side of this layer to node N77 and then extends to an adjacent node in the next layer on that face, N81. The ring then continues up one side of that layer to node N80 and from there to the next (and in this case last) layer in the structure at node N83. The ring BVR1 then passes round three sides of that endmost layer through nodes N85, N84 and N82 before returning in a return portion along the other face of the box tube structure via nodes N79, N82, N78, N75 before returning to N71. Note that the ring has been described as starting from node N71 and described in a particular direction. In fact, the ring may operate in both directions at once using bi-directional links that can operate in both directions at once. Moreover, the "starting node" of the ring can be any of the nodes on the ring, in particular for different fragments of data as already described. Note that in general terms the ring passes through three sides of each end face of the box-tube structure and travels along each side face of the box-tube structure in an alternating fashion, visiting all nodes in the face only. Note that the configuration of the virtual ring on each side face of the box structure is similar to that of the ladder structure. As has already been mentioned, the box tube structure could be considered as a type of ladder structure but with a return path which is extended by passing through an end face of the box structure and an opposed side face of the box structure in each case.

Three other virtual rings are formed in the box-tube structure. A second ring BVR2 passes from node N71 to N72 to N74 to N73 (three sides of the end face). From there it goes along the "bottom" face of the box-tube structure in an alternating fashion via nodes N78, N77, N81, N82 and N84.

It travels round three sides of the end face via nodes N85, N83 and N82 before returning along the top face of the box structure in an alternating fashion via N79, N80, N76, N75 back to N71.

A third ring is more readily explained by starting at node N73 because it uses three sides of the end face through node N71, N72 and N74 before passing in an alternating style via node N77, N76, N80, N81, N85 and N83. From there it goes via N82 and N84 to the return face of the box-tube structure which it passes in an alternating fashion via node N82, N79, N75, N78 and back to N73.

A fourth virtual ring BVR4 may be considered to start at node N74 to travel round three sides of the end face via nodes N73, N71 and N72. It then traverses the top face of the box tube structure in an alternating fashion via N76, N74, N79, N80, N83 and N82. It then traverses the end face via N84 and N85 before returning along the bottom face of the box tube structure via nodes N81, N82, N78, N77 and N74.

Each node is capable of implementing a processing or compute function. Each node could be implemented as a single processor. It is more likely, however, that each node will be implemented as a single chip or package of chips, wherein each chip comprises multiple processors. There are many possible different manifestations of each individual node. In one example, a node may be constituted by an intelligence processing unit of the type described in British applications with publication numbers GB2569843; GB2569430; GB2569275; the contents of which are herein incorporated by reference. However, the techniques described herein may be used on any type of processor constituting the nodes. What is outlined herein is a method of exchanging data in an efficient manner to implement a particular exchange pattern which is useful in machine learning models. Furthermore, the links could be manifest in any suitable way. It is advantageous that they are bi-directional and preferable that they can operate in both directions at once, although this i snot an essential requirement. One particular category of communication link is a SERDES link which has a power requirement which is independent of the amount of data that is carried over the link, or the time spent carrying that data. SERDES is an acronym for Serializer/DeSerializer and such links are known. In order to transmit a signal on a wire of such links, power is required to be applied to the wire to change the voltage in order to generate the signal. A SERDES link has the characteristic that power is continually applied to the wire to maintain it at a certain voltage level, such that signals may be conveyed by a variation in that voltage level (rather than by a variation between 0 and an applied voltage level). Thus, there is a fixed power for a bandwidth capacity on a SERDES link whether it is used or not. A SERDES link is implemented at each end by circuitry which connects a link layer device to a physical link such as copper wires. This circuitry is sometimes referred to as PHY (physical layer). PCIe (Peripheral Component Interconnect Express) is an interface standard for connecting high speed computers.

It is possible that the links could be dynamically deactivated to consume effectively no power while not in use. However, the activation time and non-deterministic nature of machine learning applications generally render dynamic activation during program execution as problematic. As a consequence, the present inventor has determined that it may be better to make use of the fact that the chip to chip link power consumption is essentially constant for any particular configuration, and that therefore the best optimisation is to maximise the use of the physical links by maintaining chip to chip traffic concurrent with IPU activity as far as is possible.

SERDES PHYs are full duplex (that is a 16 Gbit per second PHY supports 16 Gbits per second in each direction simultaneously), so full link bandwidth utilisation implies balanced bi-directional traffic. Moreover, note that there is significant advantage in using direct chip to chip communication as compared with indirect communication such as via switches. Direct chip to chip communication is much more power efficient than switched communication.

Another factor to be taken into consideration is the bandwidth requirement between nodes. An aim is to have sufficient bandwidth to conceal inter node communication behind the computations carried out at each node for distributed machine learning.

When optimising a machine architecture for machine learning, the Allreduce collective may be used as a yardstick for the required bandwidth. An example of the Allreduce collective has been given above in the handling of parameter updating for model averaging. Other examples include gradient averaging and computing norms.

As one example, the Allreduce requirements of a residual learning network may be considered. A residual learning network is a class of deep convolutional neural network. In a deep convolutional neural network, multiple layers are utilised to learn respective features within each layer. In residual learning, residuals may be learnt instead of features. A particular residual learning network known as ResNet implements direct connections between different layers of the network. It has been demonstrated that training such residual networks may be easier in some contexts than conventional deep convolutional neural networks.

ResNet 50 is a 50 layer residual network. ResNet 50 has 25 M weights so Allreduce of all weight gradients in single position floating point format F16 involves partials of 50 megabytes. It is assumed for the sake of exemplifying the bandwidth requirement that one full Allreduce is required per full batch. This is likely to be (but does not need to be) an Allreduce of gradients. To achieve this, each node must output 100 megabits per all reduce. ResNet 50 requires 250 gigaflops per image for training. If the sub-batch size per processing node is 16 images, each processor executes 400 gigaflops for each Allreduce collective. If a processor achieves 100 teraflops per second, it requires around 25 gigabits per second between all links to sustain concurrency of compute with Allreduce communication. With a sub-batch per processor of 8 images, the required bandwidth nominally doubles, mitigated in part by lower achievable teraflops per second to process the smaller batch.

Implementation of an Allreduce collective between p processors, each starting with a partial of size m megabytes (equal to the reduction size) requires that at least 2 m.(p-1) megabytes are sent over links. So the asymptotic minimum reduction time is 2 m.(p-1).(p-1) over (p.1) if each processor has 1 links it can send over simultaneously.

The above described concepts and techniques can be utilised in several different exemplifications.

In one exemplification a fixed configuration is provided for use as a computer. In this exemplification, processing nodes are interconnected as described and illustrated in the various embodiments discussed above. In such arrangements, only essential intralayer and interlayer links are put in place between the processing nodes. In the embodiments with end faces (for example the box tube prism and triangular prism) there may be more interlayer links between adjacent processing nodes in the end most layers constituting the end faces than in the intermediate layers. Note that the term "faces" is used to define not only the elongate faces, but may also refer to the end face of the prisms. However, the end face of the prism in each case constitutes a ring of processing nodes in the respective end most layers as described above.

A fixed configuration may be constructed from a precise number of processing nodes for that configuration. Alternatively, it may be provided by partitioning it from a larger structure. That is, there may be provided a set of processing nodes which constitute a multiface prism with a set of stacked layers. The processing nodes in each stacked layer may have an interlayer link to a corresponding processing node in an adjacent stacked layer and an intralayer link between neighbouring processing nodes in the layer. To that extent, this multiface prism resembles the configurations described and illustrated in the figures of the multiface structures.

A fixed configuration of a desired number of stacked layers may be provided by disconnecting each interlayer link in a designated stacked layer of the origin set of stacked layers and connecting it to a neighbouring processing node in the designated stacked layer to provide an intralayer link. In this way, a designated stacked layer of the origin set of stacked layers may be caused to form one of the first and second endmost layers of a structure. Note that an origin set of layers may in this way be partitioned into more than one fixed configuration structure.

The interlayer and intralayer links are physical links provided by suitable buses or wires as mentioned above. In one manifestation, each processing node has a set of wires extending out of it for connecting it to another processing node. This may be done for example by one or more interface of each processing node having one or more port to which one or more physical wire is connected.

In another manifestation, the links may be constituted by on-board wires. For example, a single board may support a group of chips, for example four chips. Each chip has an interface with ports connectable to the other chips. Connections may be formed between the chips by soldering wires onto the board according to a predetermined method. Note that the concepts and techniques described herein are particularly useful in that context, because they make maximise use of links which have been pre soldered between chips on a printed circuit board.

The concepts and techniques described herein are particularly useful because they enable optimum use to be made of non-switchable links. A configuration may be built by connecting up the processing nodes as described herein using the fixed non switchable links between the nodes. In some manifestations, there is no need to provide additional links between the processing nodes if such links will not be utilised. For example, in intermediate layers in the configuration there are less links between processing nodes than in the endmost layers. Alternatively, links may be provided between processing nodes, but may be permanently deactivated in certain configurations.

In order to use the configuration, a set of parallel programs are generated. The set of parallel programs contain node level programs, that is programs designated to work on particular processing nodes in a configuration. The set of parallel programs to operate on a particular configuration may be generated by a compiler. It is the responsibility of the compiler to generate node level programs which correctly define the links to be used for each data transmission step for certain data. These programs include one or more instruction for effecting data transmission in a data transmission stage which uses a link identifier to identify the link to be used for that transmission stage. For example, a processing node may have two or three active links at any one time (double that if the links are simultaneously bidirectional). The link identifier causes the correct link to be selected for the data items for that transmission stage. Note that each processing node may be agnostic of the actions of its neighbouring nodes—the exchange activity is pre compiled for each exchange stage.

Note also that links do not have to be switched—there is no need for active routing of the data items at the time at which they are transmitted, or to change the connectivity of the links.

As mentioned above, the configurations of computer networks described herein are to enhance parallelism in computing. In this context, parallelism is achieved by loading node level programs into the processing nodes of the configuration which are intended to be executed in parallel, for example to train an artificial intelligence model in a distributed manner as discussed earlier. It will readily be appreciated however that this is only one application of the parallelism enabled by the configurations described herein. One scheme for achieving parallelism is known as "bulk synchronous parallel" (BSP) computing. According to a BSP protocol, each processing node performs a compute phase and an exchange phase which follows the compute phase. During the compute phase, each processing nodes performs its computation tasks locally but does not exchange the results of its computations with the other processing nodes. In the exchange phase, each processing node is permitted to exchange the results of its computations from the preceding compute phase with the other processing nodes in the configuration. A new compute phase is not commenced until the exchange phase has been completed on the configuration. In this form of BSP protocol, a barrier synchronisation is placed at the juncture transitioning from the compute phase into the exchange phase, or transitioning from the exchange phase into the compute phase or both.

In the present embodiments, when the exchange phase is initiated, each processing node executes an instruction to exchange data with its adjacent nodes, using the link identifier established by the compiler for that exchange phase. The nature of the exchange phase can be established by using the MPI message passing standard discussed earlier. For example, a collective may be recalled from a library, such as the all reduced collective. In this way, the compiler has precompiled node level programs which control the links over which the partial vectors are transmitted (or respective fragments of the partial vectors are transmitted).

It will readily be apparent that other synchronisation protocols may be utilised.

While particular embodiments have been described, other applications and variants of the disclosed techniques may become apparent to a person skilled in the art once given the disclosure herein. The scope of the present disclosure is not limited by the described embodiments but only by the accompanying claims.

The invention claimed is:

1. A computer comprising a plurality of interconnected processing nodes, wherein the interconnected processing nodes are arranged in a configuration of multiple stacked layers which comprise a first endmost layer and a second endmost layer and at least one intermediate layer forming a multi-face prism;
   wherein each face of the multi-face prism comprises multiple stacked pairs of processing nodes, wherein the processing nodes of each pair are connected by at least two intralayer links, and the processing node of each pair is connected to a corresponding processing node in an adjacent pair by at least one interlayer link wherein the corresponding processing nodes of the first endmost layer, the at least one intermediate layer and the second endmost layer are connected by respective interlayer links to form respective edges of the configuration; and wherein each pair of processing nodes forms part of one of the layers of the configuration, each layer comprising multiple processing nodes, each processing node connected to their neighbouring processing nodes in the layer by at least one of the intralayer links to form a ring;

wherein the processing nodes are programmed to operate the configuration to transmit data around each of a plurality of one dimensional paths formed by respective sets of processing nodes and links, each one dimensional path having a first portion between the first endmost layer and the second endmost layer via the at least one intermediate layer using all processing nodes in one of the faces of the configuration only once, and a second portion provided between the second endmost layer and the first endmost layer and comprising one of the edges of the configuration.

2. The computer of claim 1 wherein the multi-face prism has three processing nodes in each layer, providing three respective faces for the first portion of respective one-dimensional paths.

3. The computer of claim 1 wherein in the at least one intermediate layer each processing node is connected to its neighbouring processing node by two intralayer links.

4. The computer of claim 1 wherein in the first and second endmost layers each processing node is connected to its neighbouring processing node by three intralayer links to enable the simultaneous transmission of data on three one dimensional paths in the configuration.

5. The computer of claim 1 which has been configured from a multi-face prism comprising a set of stacked layers, the processing nodes of each stacked layer having an interlayer link to a corresponding processing node in an adjacent stacked layer and an intralayer link between neighbouring processing nodes in the layer, by disconnecting each interlayer link in a designated stacked layer and connecting it to a neighbouring processing node in the designated stacked layer to provide an intralayer link whereby the designated stacked layer forms one of the first and second endmost layers.

6. The computer of claim 1 wherein each of the processing nodes is programmed to identify one of their interlayer and intralayer links to transmit data in order to determine the one-dimensional path for that data.

7. The computer of claim 1 wherein each of the processing nodes is programmed to deactivate any of its interlayer and intralayer links which are unused in a data transmission step.

8. The computer according to claim 1 wherein each processing node is programmed to divide a respective partial vector of that node into fragments and to transmit the data in the form of successive fragments around each one-dimensional path.

9. The computer according to claim 8 which is programmed to operate each path as a set of logical rings, wherein the successive fragments are transmitted around each logical ring in simultaneous transmission steps.

10. The computer according to claim 8 wherein each processing node is configured to output a respective fragment on each of two links simultaneously.

11. The computer according to claim 8 wherein each processing node is configured to reduce two incoming fragments with two respective corresponding locally stored fragments.

12. The computer according to claim 11 wherein each processing node is configured to transmit fully reduced fragments on each of two links simultaneously in an Allgather phase of an Allreduce collective.

13. The computer according to claim 1 where each link is bi-directional.

14. A method of generating a set of programs to be executed in parallel on a computer comprising a plurality of processing nodes, wherein the plurality of processing nodes are arranged in a configuration of multiple stacked layers which comprise a first endmost layer and a second endmost layer and at least one intermediate layer forming a multi-face prism;

wherein each face of the multi-face prism comprises multiple stacked pairs of processing nodes, wherein the processing nodes of each pair are connected to each other by at least two interlayer links, and the processing node of each pair is connected to a corresponding processing node in an adjacent pair by at least one interlayer link wherein the corresponding processing nodes of the first endmost layer, the at least one intermediate layer and the second endmost layer are connected by respective interlayer links to form respective edges of the configuration; and wherein each pair of processing nodes forms part of one of the layers of the configuration, each layer comprising multiple processing nodes, each processing node connected to their neighbouring processing nodes in the layer by at least one of the intralayer links to form a ring;

wherein method comprises:
generating at least one data transmission instruction for each program to define a data transmission stage in which data is transmitted from the processing node executing that program, wherein the data transmission instruction comprises a link identifier which defines an outgoing link on which data is to be transmitted in that data transmission stage; and determining the link identifiers in order to transmit data around each of a plurality of one dimensional paths formed by respective sets of processing nodes and links, each one dimensional path having a first portion between the first endmost layer and the second endmost layer via the at least one intermediate layer using all processing nodes in one of the faces of the configuration only once, and a second portion provided between the second endmost layer and the first endmost layer and comprising one of the edges of the configuration.

15. The method according to claim 14 wherein each program comprises one or more instruction to deactivate any of its interlayer and intralayer links which are unused in a data transmission step.

16. The method according to claim 14 wherein each program comprises one or more instruction to divide a respective partial vector of the processing node on which that program is executed into fragments and to transmit the data in the form of successive fragments over the respectively defined link.

17. The method according to claim 16 wherein each program comprises one or more instruction to output a respective fragment on each of two links simultaneously.

18. The method according to claim 16 wherein each program comprises one or more instruction to reduce two incoming fragments with two respective corresponding locally stored fragments.

19. The method according to claim 18 wherein each program comprises one or more instruction to transmit fully reduced fragments on each of two links simultaneously in an Allgather phase of an Allreduce collective.

20. A method of executing a set of programs in parallel on a computer comprising a plurality of processing nodes, wherein the plurality of processing nodes are arranged in a configuration of multiple stacked layers which comprise a first endmost layer and a second endmost layer and at least one intermediate layer forming a multi-face prism;
- wherein each face of the multi-face prism comprises multiple stacked pairs of processing nodes, wherein the processing nodes of each pair are connected to each other by at least two intralayer links, and the processing node of each pair is connected to a corresponding processing node in an adjacent pair by at least one interlayer link wherein the corresponding processing nodes of the first endmost layer, the at least one intermediate layer and the second endmost layer are connected by respective interlayer links to form respective edges of the configuration; and
- wherein each pair of processing nodes forms part of one of the layers of the configuration, each layer comprising multiple processing nodes, each processing node connected to their neighbouring processing nodes in the layer by at least one of the intralayer links to form a ring;

wherein the method comprises:
- executing at least one data transmission instruction in each program to define a data transmission stage in which data is transmitted from the processing node executing that program, wherein the data transmission instruction comprises a link identifier which defines an outgoing link on which data is to be transmitted in that data transmission stage;
- the link identifiers having been determined in order to transmit data around each of a plurality of one dimensional paths formed by respective sets of processing nodes and links, each one dimensional path having a first portion between the first endmost layer and the second endmost layer via the at least one intermediate layer using all processing nodes in one of the faces of the configuration only once, and a second portion provided between the second endmost layer and the first endmost layer and comprising one of the edges of the configuration.

21. The method according to claim 20 comprising executing the programs to operate each path as a set of logical rings, wherein successive fragments of a partial vector provided at each processing node are transmitted around each logical ring in simultaneous transmission steps.

* * * * *